US010766467B2

(12) United States Patent
Lee

(10) Patent No.: US 10,766,467 B2
(45) Date of Patent: Sep. 8, 2020

(54) COLLISION PREVENTION APPARATUS AND METHOD, AND DRIVING SUPPORT APPARATUS

(71) Applicant: MANDO CORPORATION, Pyeongtaek-si, Gyeonggi-do (KR)

(72) Inventor: Sang Yeob Lee, Seongnam-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 16/369,689

(22) Filed: Mar. 29, 2019

(65) Prior Publication Data
US 2020/0001839 A1 Jan. 2, 2020

(30) Foreign Application Priority Data

Jun. 28, 2018 (KR) .......... 10-2018-0074592

(51) Int. Cl.
B60T 7/22 (2006.01)
B60T 8/17 (2006.01)
B60T 8/172 (2006.01)
B60T 8/32 (2006.01)
B60T 8/58 (2006.01)
(Continued)

(52) U.S. Cl.
CPC .......... B60T 7/22 (2013.01); B60Q 9/008 (2013.01); B60T 8/17 (2013.01); B60T 8/172 (2013.01); B60T 8/321 (2013.01); B60T 8/58 (2013.01); B60T 8/72 (2013.01); B60T 8/74 (2013.01);
(Continued)

(58) Field of Classification Search
CPC ......... B60W 30/08; B60W 40/08; B60T 7/12; B60T 7/22; B60T 8/58; B60T 2201/03; B60T 2250/04
See application file for complete search history.

(56) References Cited

U.S. PATENT DOCUMENTS

2003/0168271 A1* 9/2003 Massen ............... G06K 9/3241
180/167
2010/0134263 A1* 6/2010 Mathony ............... B60W 30/09
340/435
(Continued)

FOREIGN PATENT DOCUMENTS

JP 2008-162457 A 7/2008
JP 2013-061274 A 4/2013
(Continued)

OTHER PUBLICATIONS

Korean Office Action dated Dec. 7, 2018 issued in Korean Patent Application No. 10-2018-0074592.

Primary Examiner — Thomas G Black
Assistant Examiner — Ce Li Li
(74) Attorney, Agent, or Firm — Morgan, Lewis & Bockius LLP

(57) ABSTRACT

The present embodiments relate to a collision prevention apparatus and method, and a driving support apparatus. The collision prevention apparatus may comprise: a collision risk determiner that determines a collision risk of a vehicle, a driving intervention determiner that determines driving intervention of a driver, and a collision prevention controller that controls a collision risk alert according to a result of determination on a collision risk of the vehicle, and adjusts a braking time point of the vehicle according to a result of determination on driving intervention of the driver.

14 Claims, 16 Drawing Sheets

(51) Int. Cl.
  *B60T 8/72* (2006.01)
  *B60T 8/74* (2006.01)
  *B60Q 9/00* (2006.01)

(52) U.S. Cl.
  CPC ....... *B60T 2230/00* (2013.01); *B60T 2250/00* (2013.01); *B60T 2250/04* (2013.01)

(56) References Cited

U.S. PATENT DOCUMENTS

| | | | | |
|---|---|---|---|---|
| 2014/0032094 | A1* | 1/2014 | Heinrichs-Bartscher | B60W 50/0097 701/301 |
| 2015/0246673 | A1* | 9/2015 | Tseng | B60W 30/00 701/23 |
| 2017/0267234 | A1* | 9/2017 | Kemp | B60W 10/04 |
| 2017/0297583 | A1* | 10/2017 | Osumi | G07C 5/008 |

FOREIGN PATENT DOCUMENTS

| | | |
|---|---|---|
| JP | 2017-091168 A | 5/2017 |
| KR | 10-2013-0028250 A | 3/2013 |
| KR | 10-2016-0069417 A | 1/2016 |
| KR | 10-2016-0135427 A | 11/2016 |

\* cited by examiner

COLLISION PREVENTION APPARATUS AND METHOD, AND DRIVING SUPPORT APPARATUS

CROSS REFERENCE TO RELATED APPLICATION

This application claims priority from Korean Patent Application No. 10-2018-0074592, filed on Jun. 28, 2018, which is hereby incorporated by reference for all purposes as if fully set forth herein.

BACKGROUND OF THE INVENTION

1. Field of the Invention

The present embodiments relate to a vehicle driving apparatus and, more specifically, to a collision prevention apparatus and method and a driving support apparatus.

2. Description of the Prior Art

In general, a vehicle driving apparatus may refer to an apparatus related to driving (e.g., vehicle driving, etc.) of a vehicle. Particularly, a vehicle driving apparatus may include an apparatus capable of supporting vehicle driving, and the like.

Such a vehicle driving support apparatus may be referred to as a vehicle auxiliary safety apparatus, a vehicle auxiliary apparatus, a vehicle safety apparatus, or the like.

Recently, studies have been actively conducted on a vehicle driving support apparatus capable of preventing collision of vehicles.

SUMMARY OF THE INVENTION

The present embodiments have been devised to solve the above problems, and an aspect of the present embodiments is to provide a collision prevention apparatus capable of controlling a braking time point of a vehicle. Further, another aspect of the present embodiments is to provide a collision prevention method in which a braking time point of a vehicle can be adjusted.

Still another aspect of the present embodiments is to provide a driving support apparatus capable of adjusting a braking time point of a vehicle.

In order to achieve the aspects, one of the present embodiments provides a collision prevention apparatus including: an information acquisition module, disposed in a vehicle and configured to capture state information of the vehicle and state information of nearby vehicles, and process the captured state information of the vehicle and the captured state information of the nearby vehicles; and a controller, configured to adjust a braking time point of the vehicle, at least partially based on processing of the state information of the vehicle and the state information of nearby vehicles, wherein the controller includes a collision risk determiner configured to determine a collision risk of the vehicle, a driving intervention determiner configured to determine driving intervention of a driver, and a collision prevention controller, configured to control a collision risk alert according to a result of determination on the collision risk of the vehicle and adjust a braking time point of the vehicle according to the result of determination on driving intervention of the driver.

Further, in order to achieve the aspects, another one of the present embodiments provides a driving support apparatus including: an information acquisition module disposed in a vehicle and configured to capture state information of the vehicle and state information of nearby vehicles; an alert module configured to generate a collision risk alert; and a domain control unit configured to process the state information of the vehicle and the state information of nearby vehicles, which are sensed by the information acquisition module, adjust a braking time point of the vehicle, and control at least one driver assistance system module provided in the vehicle, wherein the domain control unit is configured to determine a collision risk of the vehicle on the basis of at least one piece of information among the state information of the vehicle and the state information of nearby vehicles, control operation of the alert module according to a result of determination on the collision risk of the vehicle, determine driving intervention of a driver, adjust a braking time point of the vehicle according to a result of determination on the driving intervention of the driver, and control the vehicle to be braked on the basis of the braking time point of the vehicle.

Further, in order to achieve the aspects, still another one of the present embodiments provides a collision prevention method including: determining a collision risk of a vehicle; controlling a collision risk alert according to a result of determination on the collision risk of the vehicle; determining driving intervention of a driver; and adjusting a braking time point of the vehicle according to a result of determination on the driving intervention of the driver.

As described above, according to the collision prevention apparatus of the present embodiments, when a driver is info Led in advance of a risk state in the forward direction and the driver does not intervene in driving, the collision of a vehicle can be efficiently prevented by adjusting a braking time point of the vehicle.

Further, according to the collision prevention apparatus of the present embodiments, collision of a vehicle can be efficiently prevented by moving up a braking time point of the vehicle in an area of congestion of forward vehicles by using the time to collision and distance between forward vehicles.

Further, according to the collision prevention apparatus of the present embodiments, a quick reaction of a driver can be induced by adjusting reference values on the basis of a driving time of the driver.

Further, according to the collision prevention apparatus of the present embodiments, when a driver has been driving for a long time, that is, when the driving time of the driver is long, the determination on a collision risk of a vehicle can be sensitively performed by reducing reference values.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1A:
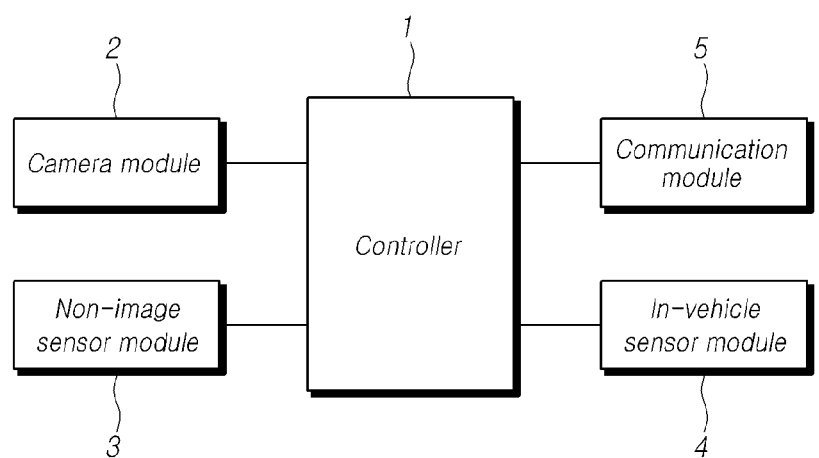
FIG. 1A is a block diagram of a vehicle according to an embodiment.

The advantages and features of the present disclosure and methods of achieving the same will be made apparent by referring to embodiments of the present disclosure as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements. The expression "and/or" includes any or all combinations of items enumerated together.

While the terms "first", "second", and the like may modify various elements, components, and/or sections, it will be apparent that such elements, components, and/or sections are not limited by the above terms. The above terms are used merely for the purpose of distinguishing an element, component, or section from other elements, components, or sections. Accordingly, it will be apparent that a first element, a first component, or a first section as mentioned below may be a second element, a second component, or a second section within the technical spirit of the present disclosure.

The terms as used herein are merely for the purpose of describing embodiments and are not intended to limit the present disclosure. As used herein, singular forms are intended to include plural forms unless the context clearly indicates otherwise. The terms "comprises" and/or "comprising" as used herein refer to the existence of a disclosed component, step, operation, and/or element, and do not exclude the existence of or a possibility of addition of one or more other components, steps, operations, and/or elements.

Unless defined otherwise, all terms as used herein (including technical terms and scientific terms) have the same meanings as those commonly understood by a person of ordinary skill in the art to which the present disclosure pertains. Such terms as those defined in a generally used dictionary are not to be interpreted as having ideal or excessively formal meanings unless clearly defined in the present disclosure.

In the following description of the embodiments of the present disclosure, a detailed description of known functions and configurations incorporated herein will be omitted when the same may make the subject matter of the present disclosure unclear. Meanwhile, terms described later are defined in consideration of the functions of the present disclosure, but the meaning of the terms may be changed according to a user, intention of an operator, or convention. Therefore, the definitions of the terms should be made based on the contents throughout the specification.

Hereinafter, a collision prevention apparatus and method and a driving support apparatus according to the present embodiments are described with reference to the accompanying drawings.

Figure 1B:
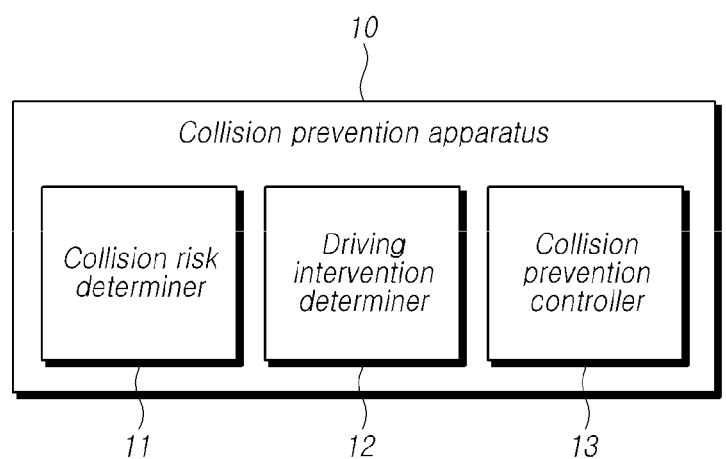
FIG. 1B is an overall block diagram for illustrating a collision prevention apparatus according to the present embodiments.

FIG. 1A is a block diagram of a vehicle according to an embodiment. FIG. 1B is an overall block diagram for illustrating a collision prevention apparatus according to the present embodiments.

Referring to FIG. 1A, a vehicle may include a controller 1, a camera module 2, a non-image sensor 3, an in-vehicle sensor module 4, a communication module 5, and the like.

For example, the camera module 2 is configured to have a view of an inside or an outside the vehicle, and may include an image sensor that captures image data, and a processor that processes the captured image data.

For example, the image sensor may be disposed in the vehicle so as to have a view of the inside or the outside of the vehicle. At least one image sensor may be mounted on each part of the vehicle so as to have a view of the front, side, or rear of the vehicle.

Information of an image captured by the image sensor includes image data, and may thus refer to image data captured by the image sensor. Hereinafter, information of an image captured by the image sensor refers to image data captured by the image sensor. Image data captured by the image sensor may be generated in one of, for example, raw AVI, MPEG-4, H.264, DivX, and JPEG formats.

The image data captured by the image sensor may be processed by the processor. The processor may operate to process the image data captured by the image sensor.

The processor may be implemented in hardware using at least one of electrical units capable of processing image data and performing other functions, such as application-specific integrated circuits (ASICs), digital signal processors (DSPs), digital signal-processing devices (DSPDs), programmable logic devices (PLDs), field-programmable gate arrays (FPGAs), controllers, microcontrollers, microprocessors, and the like.

The non-image sensor module 3 refers to sensor modules other than the camera module 2 that captures an image. For example, multiple non-image sensor modules 3 may be disposed in the vehicle to have sensing areas inside or outside the vehicle, so as to capture sensing data. Example of such multiple non-image sensor modules 3 may include a radar sensor, a lidar sensor, an ultrasonic sensor, and the like. A non-image sensor module 3 may not be provided, or one or more non-image sensor modules 3 may be provided.

The in-vehicle sensor module 4 refers to a sensor for sensing in-vehicle information. For example, the in-vehicle sensor module 4 may refer to a torque sensor for sensing a steering torque, a steering angle sensor for sensing a steering angle, a motor position sensor for sensing information of a steering motor, a vehicle speed sensor, a vehicle motion detection sensor for sensing motion of a vehicle, a vehicle position detection sensor, and the like. In addition, the in-vehicle sensor module 4 may refer to a sensor for sensing a variety of data in the vehicle, and may include one or more sensors.

The communication module 5 functions to perform communication between vehicles, communication between a vehicle and infrastructure, communication between a vehicle and a server, in-vehicle communication, and the like. To this end, the communication module 5 may include a transmission module and a reception module. For example, the communication module 5 may include a broadcast reception module, a wireless Internet module, a short-range communication module, a position information module, an optical communication module, a V2X communication module, and the like.

The controller 1 may acquire data from at least one among the camera module 2, the non-image sensor module 3, the in-vehicle sensor module 4, and the communication module 5, and may control a variety of operations of the vehicle on the basis of the acquired data. Alternatively, the controller 1 may acquire image data from the camera module 2 and process the image data. The controller 1 may receive sensing data from the non-image sensor module 3 and process the sensing data. Alternatively, the controller 1 may acquire data from the in-vehicle sensor module 4 or the communication module 5 and process the acquired data. In order to perform such processing, the controller 1 may include at least one processor.

In addition, the controller 1 may control the operation of at least one module among the camera module 2, the non-image sensor module 3, the in-vehicle sensor module 4, and the communication module 5. Further, the controller 1 may control operation of various driver assistance systems included in the vehicle.

A radar sensor or a radar system used in the present disclosure may include at least one radar sensor unit, for example, one or more among a front detection radar sensor mounted on the front of the vehicle, a rear radar sensor mounted on the rear of the vehicle, and a lateral detection radar sensor mounted on each lateral side of the vehicle or a rear-lateral detection radar sensor. The radar sensor or radar system may analyze a transmission signal and a reception signal to process data, and may accordingly detect information relating to an object. To this end, the radar sensor or radar system may include an electronic control unit (ECU) or a processor. A communication link, such as an appropriate vehicle network bus, etc., may be used for data transmission or signal communication from the radar sensor to the ECU.

The radar sensor includes one or more transmission antennas that transmit a radar signal, and one or more reception antennas that receive a reflection signal reflected from the object.

The radar sensor according to the present embodiment may adopt a multi-dimensional antenna arrangement and a Multiple-Input Multiple-Output signal transceiving scheme in order to form a virtual antenna aperture larger than an actual antenna aperture.

For example, a two-dimensional antenna array is used to achieve horizontal and vertical angular accuracy and resolution. When a two-dimensional antenna array is used, signals are transmitted or received by two scans that are individually (time multiplexing) performed horizontally and vertically, and MIMO may be used separately from the two-dimensional horizontal and vertical radar scans (time multiplexing).

More specifically, the radar sensor according to the present embodiment may adopt a two-dimensional antenna array that includes a transmission antenna unit including a total of 12 transmission antennas (Tx) and a reception antenna unit including 16 reception antennas (Rx), and consequently may have an arrangement of a total of 192 virtual reception antennas.

The transmission antenna unit may have three transmission antenna groups, each of which has four transmission antennas, in which a first transmission antenna group may be spaced apart from a second transmission antenna group by a predetermined distance in the vertical direction, and the first or second transmission antenna group may be spaced apart from a third transmission antenna group by a predetermined distance (D) in the horizontal direction.

The reception antenna unit may include four reception antenna groups, each of which includes four reception antennas, in which each reception antenna group may be spaced apart in the vertical direction, and the reception antenna unit may be disposed between the first transmission antenna group and the third transmission antenna group, which are spaced apart from each other in the horizontal direction.

In another embodiment, the antennas of the radar sensor are arranged in a two-dimensional antenna array such that each antenna patch has a rhombus lattice arrangement so as to reduce unnecessary side lobes.

Alternatively, such a two-dimensional antenna arrangement may include a V-shape antenna array in which a plurality of radiation patches is arranged in a V shape, and more specifically, a two-dimensional antenna arrangement may include two V-shaped antenna arrays. In this case, the apex of each V-shape antenna array makes a single feed.

Alternatively, two-dimensional antenna arrangement may include an X-shape antenna array in which a plurality of radiation patches is arranged in an X shape, and more specifically, two-dimensional antenna arrangement may include two X-shaped antenna arrays. In this case, a single feed is made around each X-shaped antenna array. Further, the radar sensor according to the present embodiment may use an MIMO antenna system in order to implement vertical and horizontal detection accuracy or resolution.

More specifically, in an MIMO system, transmission antennas may transmit respective signals having independent waveforms that are differentiated from each other. That is, the transmission antennas may transmit respective signals having independent waveforms that are differentiated from each other, and each reception antenna may determine which transmission antenna transmitted a reflection signal reflected from the object due to the different waveforms of these signals.

Further, the radar sensor according to the present embodiment may include a substrate including a transmission/reception antenna, a radar housing that accommodates a circuit, and a radome that constitutes the appearance of the radar housing. The radome is made of a material capable of reducing attenuation of a transmitted or received radar signal, and the radome may include front and rear bumpers of the vehicle, a grille, a side vehicle body, and the outer surface of the vehicle components.

That is, the radome of the radar sensor may be disposed inside a vehicle grill, a bumper, a vehicle body, and the like, and may be disposed as a part of components constituting the outer surface of the vehicle, such as a part of a vehicle grille, a bumper, and a vehicle body, so as to provide the convenience of mounting the radar sensor while improving the aesthetics of the vehicle.

The lidar may include a laser transmitter, a receiver, and a processor. The lidar may be implemented in a Time of Flight (TOF) scheme or a phase-shift scheme.

The lidar may detect an object on the basis of the transmitted laser, and may detect the distance and relative speed of the detected object. When the object is a stationary object (for example, a roadside tree, a street lamp, a traffic light, a traffic sign, etc.), the lidar may detect a driving speed of the vehicle on the basis of a Time of Flight (TOF) by the object.

The ultrasonic sensor may include an ultrasonic transmitter, a receiver, and a processor.

The ultrasonic sensor may detect an object on the basis of a transmitted ultrasonic wave, and may detect the distance and relative speed of the detected object. When the object is a stationary object (for example, a roadside tree, a street lamp, a traffic light, a traffic sign, etc.), the ultrasonic sensor may detect a driving speed of the vehicle on the basis of a Time of Flight (TOF) by the object.

The above terms and exemplary descriptions of respective elements are for convenience of understanding, and the elements are not limited to the corresponding terms and exemplary descriptions. Hereinafter, in order to more clearly describe embodiments according to the present disclosure, the above-described terms may be modified. The elements of the vehicle explained in FIG. 1A have been illustratively described. Hereinafter, in order to more clearly describe the present technical idea, the elements may be modified or omitted, or an element may be added.

Referring to FIG. 1B, the collision prevention apparatus 10 according to the present embodiments may include a collision risk determiner 11, a driving intervention determiner 12, a collision prevention controller 13, and the like. According to an embodiment, the controller 1 described in FIG. 1A may be implemented to include the collision risk determiner 11 configured to determine a collision risk of the vehicle, the driving intervention determiner 12 configured to determine driving intervention of a driver, and the collision prevention controller 13 configured to control a collision risk alert according to the result of determination on the collision risk of the vehicle, and adjust a braking time point of the vehicle according to the result of determination of the driving intervention of the driver.

Further, the collision prevention apparatus 10 may further include an information acquisition module disposed in the vehicle and configured to capture state information of the vehicle and state information of nearby vehicles, and process the captured state information of the vehicle and the captured state information of the nearby vehicles. According to an example, in order to acquire state information of nearby vehicles, the information acquisition module may include at least one of a camera module 2 configured to be disposed in the vehicle to have a view of an outside the vehicle so as to capture image data, and process the captured image data, and at least one non-image sensor module 3 configured to be disposed in the vehicle to have a sensing area outside the vehicle so as to capture sensing data, and process the captured sensing data. Further, the information acquisition module may include at least one in-vehicle sensor module 4, which is disposed in the vehicle to sense state information of the vehicle and processes the sensed state information of the vehicle.

The collision risk determiner 11 may determine a collision risk of the vehicle.

For example, the collision risk determiner 11 may determine a collision risk of the vehicle on the basis of at least one of state information of the vehicle and state information of nearby vehicles. That is, the collision risk determiner 11 may determine that there is a collision risk of the vehicle when the possibility of a collision with nearby vehicles is high, and may determine that there is no collision risk of the vehicle when the possibility of a collision with nearby vehicles is low, on the basis of at least one of the state information of the vehicle and the state information of nearby vehicles.

The state information of the vehicle may include at least one among steering angle information, brake pedal information, accelerator pedal information, and driving time information of a driver, but is not limited thereto, and may include any information as long as the information indicates the state of the vehicle.

The nearby vehicles may include at least one vehicle among a forward vehicle, a rear vehicle, a leftward vehicle, and a rightward vehicle, but are not limited thereto, and may include all nearby vehicles located around the vehicle.

The state information of nearby vehicles may include at least one among speed reduction state information of forward vehicles, speed information of forward vehicles, acceleration information of forward vehicles, information of time to collision (TTC) between forward vehicles, and information of the distance between forward vehicles, but is not limited thereto, and may include any information as long as the information indicates the state of nearby vehicles.

Although the following description assumes that nearby vehicles are forward vehicles for the sake of simplicity of description, nearby vehicles are not limited to forward vehicles and may include all nearby vehicles (for example, a rear vehicle, a leftward vehicle, a rightward vehicle, and the like) located around the vehicle.

The collision risk determiner 11 may determine the collision risk of the vehicle on the basis of the speed reduction state information of forward vehicles.

For example, the collision risk determiner 11 may determine the collision risk of the vehicle by determining speed reduction states of forward vehicles on the basis of speed reduction state information of forward vehicles, among state information of nearby vehicles.

That is, the collision risk determiner 11 may compare speed reduction values of forward vehicles with a predetermined reference speed reduction value, and may determine the collision risk of the vehicle based on the comparison result.

When the speed reduction values of forward vehicles exceed the predetermined reference speed reduction value, the collision risk determiner 11 may determine that there is a collision risk of the vehicle due to a high possibility of collision between the vehicle and nearby vehicles.

When the speed reduction values of forward vehicles are equal to or smaller than the predetermined reference speed reduction value, the collision risk determiner 11 may determine that there is no collision risk of the vehicle due to a low possibility of collision between the vehicle and nearby vehicles.

The speed reduction state information of forward vehicles may include at least one of speed values of the forward vehicles and acceleration values of the forward vehicles, but is not limited thereto, and may include any information of the forward vehicles as long as the speed reduction states of the forward vehicles can be determined using the information.

The collision risk determiner 11 may determine the collision risk of the vehicle on the basis of at least one of speed values of forward vehicles and acceleration values of forward vehicles.

That is, the collision risk determiner 11 may perform comparison of at least one between speed values of forward vehicles and a predetermined reference speed value and between acceleration values of forward vehicles and a predetermined reference acceleration value, and may determine a risk of collision of the vehicle according to a comparison result.

When the comparison result shows at least one of the case where the speed values of the forward vehicles are smaller than the predetermined reference speed value and the case where the acceleration values of the forward vehicles are smaller than the predetermined reference acceleration value, the collision risk determiner 11 may determine that there is a collision risk of the vehicle due to the high possibility of collision between the vehicle and nearby vehicles.

When the comparison result shows at least one of the case where the speed values of the forward vehicles are equal to or larger than the predetermined reference speed value and the case where the acceleration values of the forward vehicles are equal to or larger than the predetermined reference acceleration value, the collision risk determiner 11 may determine that there is no collision risk of the vehicle due to the low possibility of collision between the vehicle and nearby vehicles.

The predetermined reference speed reduction value, the predetermined reference speed value, and the predetermined reference acceleration value described above are reference values by which the degree of a collision risk of the vehicle can be determined, may be previously stored values and/or variable values, or may alternatively be a single value, but are not limited thereto. The predetermined reference speed reduction value, the predetermined reference speed value, and the predetermined reference acceleration value may have multiple values or fall in multiple ranges.

The collision risk determiner 11 may adjust at least one among the predetermined reference speed reduction value, the predetermined reference speed value, and the predetermined reference acceleration value according to a vehicle driving time of a driver.

According to an example, the vehicle driving time of the driver may be calculated on the basis of at least one among an elapsed time after the start of the vehicle, a time during which a seat belt is being fastened, a time during which the driver is sitting, and an elapsed time on a navigation device. For example, the driving time may be calculated by accumulating the elapsed time after the start of the vehicle. Alternatively, the driving time may be calculated by detecting whether a driver's seat belt is fastened and accumulating a detected time during which the driver's seat belt is being fastened. Alternatively, the driving time may be calculated by accumulating a sitting time detected by a seat sensor provided in a driver's seat. The driving time may also be calculated by a traveling time received from the navigation device.

For example, the collision risk determiner 11 may compare a vehicle driving time of the driver with a predetermined reference driving time, and may adjust at least one value among the predetermined reference speed reduction value, the predetermined reference speed value, and the predetermined reference acceleration value according to a comparison result.

When the vehicle driving time of the driver is equal to or longer than the predetermined reference driving time according to the comparison result, the collision risk determiner 11 may lower at least one value among the predetermined reference speed reduction value, the predetermined reference speed value, and the predetermined reference acceleration value.

That is, when the driver has been driving for a long time, that is, when the driving time of the driver is long, a collision prevention apparatus 10 according to the present embodiments may reduce the reference values so as to sensitively perform determination on the collision risk of the vehicle.

When the vehicle driving time of the driver is shorter than the predetermined reference driving time according to the comparison result, the collision risk determiner 11 may maintain at least one value among the predetermined reference speed reduction value, the predetermined reference speed value, and the predetermined reference acceleration value.

The predetermined reference driving time is a reference value, by which reference values enabling the degree of the collision risk of the vehicle to be determined can be changed, may be a previously stored value and/or a variable value, or may alternatively be a single value, but is not limited thereto. The predetermined reference driving time may have multiple values or fall in multiple ranges.

The driving intervention determiner 12 may determine driving intervention of a driver.

For example, the driving intervention determiner 12 may determine driving intervention of the driver on the basis of at least one of state information of the vehicle and state information of nearby vehicles. That is, the driving intervention determiner 12 may determine that the driver intervenes in driving when the driver intervenes in driving, or may determine that the driver does not intervene in driving when the driver does not intervene in driving, on the basis of at least one of state information of the vehicle and state information of nearby vehicles.

The driving intervention determiner 12 may determine whether the driver intervenes in driving on the basis of at least one of steering angle information, brake pedal information, and accelerator pedal information, among the state information of the vehicle.

That is, the driving intervention determiner 12 may perform comparison of at least one between a steering angle value and a predetermined reference steering angle value, between a brake pedal pressure value and a predetermined reference brake pedal pressure value, and between an accelerator pedal change value and a predetermined reference accelerator pedal change value, and may determine driving intervention of the driver according to a comparison result.

When a comparison result shows at least one of the case where the steering angle value is smaller than the predetermined reference steering angle value, the case where the brake pedal pressure value is smaller than the predetermined reference brake pedal pressure value, and the case where the accelerator pedal change value is smaller than the predetermined reference accelerator pedal change value, the driving intervention determiner 12 may determine that the driver does not intervene in driving. When the comparison result shows at least one of cases where the steering angle value is equal to or larger than the predetermined reference steering angle value, the brake pedal pressure value is equal to or larger than the predetermined reference brake pedal pressure value, and the accelerator pedal change value is equal to or larger than the predetermined reference accelerator pedal change value, the driving intervention determiner 12 may determine that the driver intervenes in driving.

The predetermined reference steering angle value, the predetermined reference brake pedal pressure value, and the predetermined reference accelerator pedal change value are reference values by which whether the driver intervenes in driving can be determined, and may be previously stored values and/or variable values, or may alternatively be a single value, but are not limited thereto. The predetermined reference steering angle value, the predetermined reference brake pedal pressure value, and the predetermined reference accelerator pedal change value may have multiple values or fall in multiple ranges.

The collision prevention controller 13 may control (or adjust) a collision risk alert according to the result of determination of a collision risk of the vehicle, and may adjust (or control) a braking time point of the vehicle (or a steering time point of the vehicle) according to the result of determination on driving intervention of a driver.

Specifically, the collision prevention controller 13 may be connected to the collision risk determiner 11. The collision prevention controller 13 may receive a result of determination on a collision risk of the vehicle from the collision risk determiner 11. The collision prevention controller 13 may control (or adjust) a collision risk alert according to the result of determination on the collision risk of the vehicle, which has been received from the collision risk determiner 11.

When there is a collision risk of the vehicle according to the result of determination on the collision risk of the vehicle, which has been received from the collision risk determiner 11, the collision prevention controller 13 may control (or adjust) the collision risk alert so that the collision risk alert is generated.

When there is no collision risk of the vehicle according to the result of determination on the collision risk of the vehicle, which has been received from the collision risk determiner 11, the collision prevention controller 13 may control (or adjust) the collision risk alert so that the collision risk alert is not generated.

Further, the collision prevention controller 13 may be connected to the driving intervention determiner 12. The collision prevention controller 13 may receive the result of the determination on driving intervention of the driver from the driving intervention determiner 12. The collision prevention controller 13 may adjust (or control) a braking time point of the vehicle (or a steering time point of the vehicle) according to a result of determination on driving intervention of the driver, which has been received from the driving intervention determiner 12.

That is, when the driver intervenes in driving according to the result of determination on driving intervention of the driver, which has been received from the driving intervention determiner 12, the collision prevention controller 13 may adjust (or control) the braking time point of the vehicle (or the steering time point of the vehicle) so as to maintain the current braking time point of the vehicle (or the current steering time point of the vehicle).

When the driver does not intervene in driving according to the result of determination on driving intervention of the driver, which has been received from the driving intervention determiner 12, the collision prevention controller 13 may adjust (or control) the braking time point of the vehicle (or the steering time point of the vehicle) so that the braking time point of the vehicle (or the steering time point of the vehicle) is moved up before the current braking time point of the vehicle (or the current steering time point of the vehicle).

For example, when the driver does not intervene in driving according to the result of determination on driving intervention of the driver, which has been received from the driving intervention determiner 12, the collision prevention controller 13 may adjust (or control) the braking time point of the vehicle (or the steering time point of the vehicle) on the basis of at least one value among a value of time to collision (TTC) between forward vehicles and a value of a distance between forward vehicles.

That is, when the driver does not intervene in driving according to the result of determination on driving intervention of the driver, which has been received from the driving intervention determiner 12, the collision prevention controller 13 may perform comparison of at least one between a predetermined reference value of time to collision and a value of time to collision between forward vehicles, and between a predetermined reference distance value and a value of the distance between forward vehicles, and may adjust (or control) the braking time point of the vehicle (or the steering time point of the vehicle) according to the comparison result.

In at least one of the case where the value of time to collision between forward vehicles is smaller than the predetermined reference value of time to collision and the case where the value of distance between forward vehicles is smaller than the predetermined reference distance value, the collision prevention controller 13 may adjust (or control) the braking time point of the vehicle (or the steering time point of the vehicle) so that the braking time point of the vehicle (or the steering time point of the vehicle) is moved up before the current braking time point of the vehicle (or the current steering time point of the vehicle).

In at least one of the case where the value of time to collision between forward vehicles is equal to or larger than the predetermined reference value of time to collision and the case where the value of distance between forward vehicles is equal to or larger than the predetermined reference distance value, the collision prevention controller 13 may adjust (or control) the braking time point of the vehicle (or the steering time point of the vehicle) so as to maintain the current braking time point of the vehicle (or the current steering time point of the vehicle).

The predetermined reference value of time to collision and the predetermined reference distance value are reference values, by which whether the braking time point of the vehicle (or the steering time point of the vehicle) is adjusted (or controlled) can be determined, and may be previously stored values and/or variable values, or may alternatively be a single value, but are not limited thereto. The predetermined reference value of time to collision and the predetermined reference distance value may have multiple values or fall in multiple ranges.

The collision prevention controller 13 may control (or adjust) the collision risk alert according to a result of determination on the collision risk of the vehicle, and then may adjust (or control) the braking time point of the vehicle (or the steering time point of the vehicle) according to the result of determination on driving intervention of the driver.

For example, when there is a collision risk of the vehicle, the collision prevention controller 13 may perform control (or adjust) to generate a collision risk alert, and after the collision risk alert is generated, the collision prevention controller 13 may adjust (or control) the braking time point of the vehicle (or the steering time point of the vehicle) according to the result of determination on driving intervention of the driver.

Specifically, when there is no collision risk of the vehicle according to the result of determination on the collision risk of the vehicle, which has been received from the collision risk determiner 11, the collision prevention controller 13 may control (or adjust) the collision risk alert so that the collision risk alert is not generated.

Further, when the result of determination on the collision risk of the vehicle, which has been received from the collision risk determiner 11, shows that there is a collision risk of the vehicle, the collision prevention controller 13 may control (or adjust) the collision risk alert so that the collision risk alert is generated.

After the collision risk alert is generated, the collision prevention controller 13 may adjust (or control) the braking time point of the vehicle (or the steering time point of the vehicle) according to the result of determination on driving intervention of the driver, which has been received from the driving intervention determiner 12.

That is, after the collision risk alert is generated, when the result of determination on driving intervention of the driver, which has been received from the driving intervention determiner 12, shows that the driver intervenes in driving, the collision prevention controller 13 may adjust (or control) the braking time point of the vehicle (or the steering time point of the vehicle) so as to maintain the current braking time point of the vehicle (or the current steering time point of the vehicle).

After the collision risk alert is generated, when the result of determination on driving intervention by the driver, which has been received from the driving intervention determiner 12, shows that the driver does not intervene in driving, the collision prevention controller 13 may adjust (or control) the braking time point of the vehicle (or the steering time point of the vehicle) so that the braking time point of the vehicle (or the steering time point of the vehicle) is moved up before the current braking time point of the vehicle (or the current steering time point of the vehicle).

For example, after the collision risk alert is generated, when the result of determination on driving intervention by the driver, which has been received from the driving intervention determiner 12, shows that the driver does not intervene in driving, the collision prevention controller 13 may adjust (or control) the braking time point of the vehicle (or the steering time point of the vehicle) on the basis of at least one value among a value of time to collision (TTC) between forward vehicles and a value of a distance between forward vehicles.

That is, after the collision risk alert is generated, when the result of determination on driving intervention by the driver, which has been received from the driving intervention determiner 12, shows that the driver does not intervene in driving, the collision prevention controller 13 may perform comparison of at least one between a predetermined reference value of time to collision and a value of time to collision between forward vehicles, and between a predetermined reference distance value and a value of the distance between forward vehicles, and may adjust (or control) the braking time point of the vehicle according to the comparison result.

In at least one of the case where the value of time to collision between forward vehicles is smaller than the predetermined reference value of time to collision and the case where the value of the distance between forward vehicles is smaller than the predetermined reference distance value, the collision prevention controller 13 may adjust (or control) the braking time point of the vehicle (or the steering time point of the vehicle) so that the braking time point of the vehicle (or the steering time point of the vehicle) is moved up before the current braking time point of the vehicle (or the current steering time point of the vehicle).

In at least one of the case where the value of time to collision between forward vehicles is equal to or larger than the predetermined reference value of time to collision and the case where the value of the distance between forward vehicles is equal to or larger than the predetermined reference distance value, the collision prevention controller 13 may adjust (or control) the braking time point of the vehicle (or the steering time point of the vehicle) so as to maintain the current braking time point of the vehicle (or the current steering time point of the vehicle).

According to an example, the collision prevention controller 13 may adjust a braking time point of the vehicle or a steering time point of the vehicle in consideration of the state of the driver. To this end, the camera module 2 may be further provided to capture image data of the driver inside the vehicle. The collision prevention controller 13 may determine the state of the driver on the basis of image data. For example, the collision prevention controller 13 may determine whether the driver is in a sleepy state or an inattentive state via blinking of eyes of the driver, the gaze of the driver, and the like. When the driver is in an inadequate state, such as a sleepy state or an inattentive state, the collision prevention controller 13 may perform control to move up the braking time point of the vehicle or the steering time point of the vehicle.

The forward vehicles may include a plurality of forward vehicles. Hereinafter, it is described that the plurality of forward vehicles includes first to third forward vehicles for the sake of simplicity of description, but the plurality of forward vehicles is not limited thereto, and the forward vehicles may include four or more forward vehicles.

The forward vehicles may include a first forward vehicle (a forward vehicle) located in front of the vehicle (the subject vehicle), a second forward vehicle (a forward vehicle of the forward vehicle) located in front of the first forward vehicle, and a third forward vehicle (a forward vehicle of the forward vehicle of the forward vehicle) located in front of the second forward vehicle.

The collision risk determiner 11 may determine a collision risk of the vehicle on the basis of speed reduction state information of the first to third forward vehicles.

For example, the collision risk determiner 11 may determine a collision risk between the vehicle and the first forward vehicle by determining speed reduction states of the first to third forward vehicles on the basis of the speed reduction state information of the first to third forward vehicles from among state information of nearby vehicles.

That is, the collision risk determiner 11 compares speed reduction values of the first to third forward vehicles with the predetermined reference speed reduction value, and may determine a collision risk between the vehicle and the first forward vehicle according to the comparison result.

When the comparison result shows at least one of cases where the speed reduction value of the first forward vehicle exceeds the predetermined reference speed reduction value, the speed reduction value of the second forward vehicle exceeds the predetermined reference speed reduction value, and the speed reduction value of the third forward vehicle exceeds the predetermined reference speed reduction value, the collision risk determiner 11 may determine that there is a collision risk between the vehicle and the first forward vehicle due to the high possibility of collision between the vehicle and the first vehicle.

When the comparison result shows at least one of cases where the speed reduction value of the first forward vehicle is equal to or smaller than the predetermined reference speed reduction value, the speed reduction value of the second forward vehicle is equal to or smaller than the predetermined reference speed reduction value, and the speed reduction value of the third forward vehicle is equal to or smaller than the predetermined reference speed reduction value, the collision risk determiner 11 may determine that there is no collision risk between the vehicle and the first forward vehicle due to the low possibility of collision between the vehicle and the first forward vehicle.

Further, the collision risk determiner 11 may determine a collision risk between the vehicle and the first forward vehicle on the basis of at least one of speed values of the first to third forward vehicles and acceleration values of the first to third forward vehicles.

That is, the collision risk determiner 11 may perform comparison of at least one between speed values of the first to third forward vehicles and the predetermined reference speed value, and between acceleration values of the first to third forward vehicles and the predetermined reference acceleration value, and may determine a collision risk between the vehicle and the first forward vehicle according to the comparison result.

When the comparison result shows at least one of cases where the speed value of the first forward vehicle is smaller than the predetermined reference speed value, the speed value of the second forward vehicle is smaller than the predetermined reference speed value, the speed value of the third forward vehicle is smaller than the predetermined reference speed value, the acceleration value of the first forward vehicle is smaller than a predetermined acceleration value, the acceleration value of the second forward vehicle is smaller than the predetermined acceleration value, and the acceleration value of the third forward vehicle is smaller than the predetermined acceleration value, the collision risk determiner 11 may determine that there is a collision risk between the vehicle and the first forward vehicle due to a high possibility of collision between the vehicle and the first forward vehicle.

When the comparison result shows at least one of cases where the speed value of the first forward vehicle is equal to or larger than the predetermined reference speed value, the speed value of the second forward vehicle is equal to or larger than the predetermined reference speed value, the speed value of the third forward vehicle is equal to or larger than the predetermined reference speed value, the acceleration value of the first forward vehicle is equal to or larger than the predetermined acceleration value, the acceleration value of the second forward vehicle is equal to or larger than the predetermined acceleration value, and the acceleration value of the third forward vehicle is equal to or larger than the predetermined acceleration value, the collision risk determiner 11 may determine that there is no collision risk between the vehicle and the first forward vehicle due to the low possibility of collision between the vehicle and the first forward vehicle.

Further, when the result of the determination on driving intervention of the driver, which has been received from the driving intervention determiner 12, shows that the driver does not intervene in driving, the collision prevention controller 13 may adjust (or control) a braking time point of the vehicle on the basis of at least one of values of a time to collision (TTC) between the first to third forward vehicles and values of the difference between the first to third forward vehicles.

That is, when the result of determination on driving intervention of the driver, which has been received from the driving intervention determiner 12, shows that the driver does not intervene in driving, the collision prevention controller 13 may perform comparison of at least one between the predetermined reference value of time to collision and values of time to collision between the first to third forward vehicles, and between the predetermined reference distance value and values of the distance between the first to third forward vehicles, and the collision prevention controller 13 may adjust (or control) the braking time point of the vehicle (or the steering time point of the vehicle) according to the comparison result.

When the comparison result shows at least one of cases where the value of time to collision between the first and second forward vehicles is smaller than the reference value of time to collision, the value of time to collision between the second and third forward vehicles is smaller than the reference value of time to collision, the value of the distance between the first and second forward vehicles is smaller than the predetermined reference distance value, and the value of the distance between the second and third forward vehicles is smaller than the predetermined reference distance value, the collision prevention controller 13 may adjust (or control) the braking time point of the vehicle (or the steering time point of the vehicle) so that the braking time point of the vehicle (or the steering time point of the vehicle) is moved up before the current braking time point of the vehicle (or the current steering time point of the vehicle).

When the comparison result shows at least one of cases where the value of time to collision between the first and second forward vehicles is equal to or larger than the reference value of time to collision, the value of time to collision between the second and third forward vehicles is equal to or larger than the reference value of time to collision, the value of the distance between the first and second forward vehicles is equal to or larger than the predetermined reference distance value, and the value of the distance between the second and third forward vehicles is equal to or larger than the predetermined reference distance value, the collision prevention controller 13 may adjust (or control) the braking time point of the vehicle (or the steering time point of the vehicle) so as to maintain the current braking time point of the vehicle (or the current steering time point of the vehicle).

As described above, the collision prevention apparatus according to the present embodiments can efficiently prevent collision of a vehicle by adjusting a braking time point of the vehicle when a driver is informed in advance of a risk state in the forward direction and the driver does not intervene in driving.

Further, the collision prevention apparatus according to the present embodiments can efficiently prevent collision of a vehicle by moving up a braking time point of the vehicle in an area of congestion of forward vehicles by using the time to collision and distance between forward vehicles.

Further, the collision prevention apparatus according to the present embodiments can induce a quick reaction of a driver by adjusting reference values on the basis of the driving time of the driver.

Figure 2A:
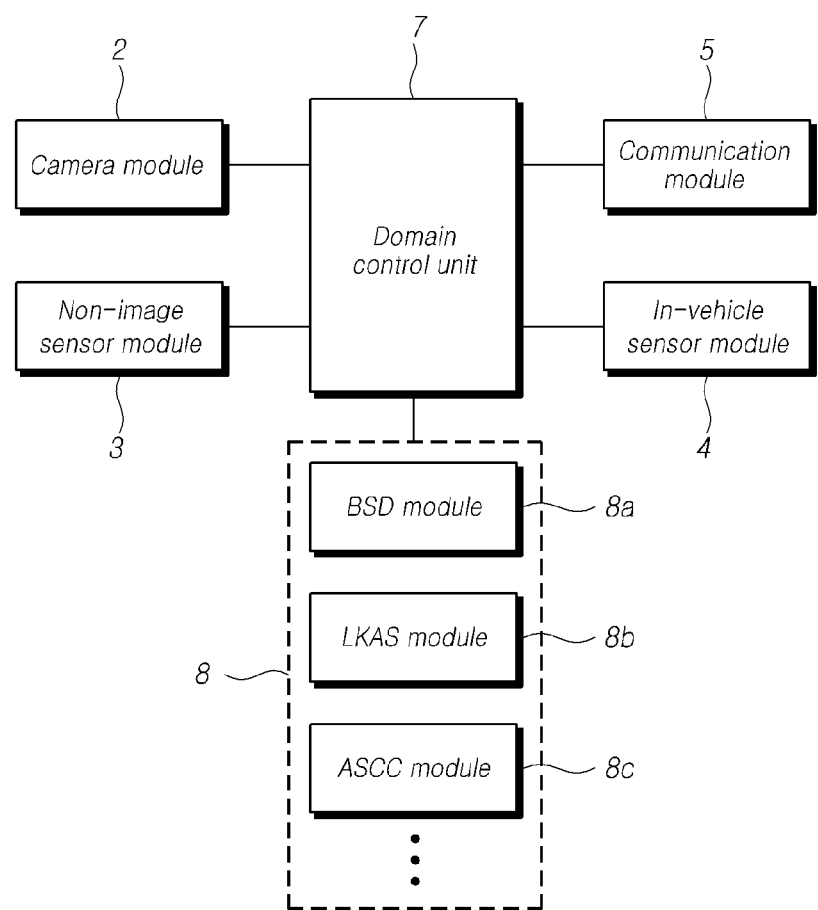
FIG. 2A is a block diagram of a vehicle according to another embodiment.
Figure 2B:
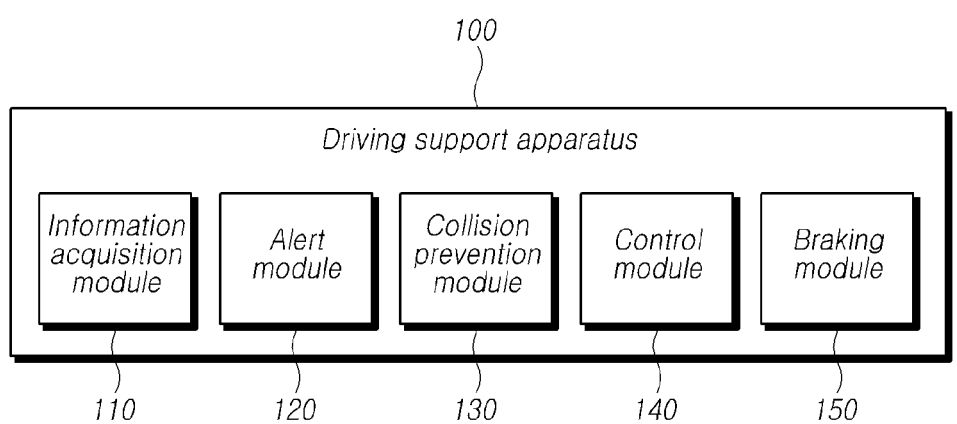
FIG. 2B is an overall block diagram for illustrating a driving support apparatus according to the present embodiments.

FIG. 2A is a block diagram of a vehicle according to another embodiment. FIG. 2B is an overall block diagram for illustrating a driving support apparatus according to the present embodiments.

Referring to FIG. 2A, a vehicle may include at least one among the camera module 2, the non-image sensor module 3, the in-vehicle sensor module 4, and the communication module 5. A description thereof has been given with reference to FIG. 1A, and therefore will not be described.

The vehicle may include a domain control unit (DCU) 7. The domain control unit 7 may be configured to receive image data captured by at least one image sensor, receive sensing data captured by a plurality of non-image sensors, and process at least one of image data and sensing data. To this end, the domain control unit 7 may include at least one processor.

Alternatively, the domain control unit 7 may transmit data to or receive data from at least one among the camera module 2, the non-image sensor module 3, the in-vehicle sensor module 4, the communication module 5, and a driver assistance system module 8, and may process data received via these modules. That is, the domain control unit 7 may be provided in the vehicle, and may communicate with at least one module mounted in the vehicle. To this end, the domain control unit 7 may further include an appropriate data link or communication link, such as a vehicle network bus for data transmission or signal communication.

The domain control unit 7 may function to control one or more among multiple driver assistance systems (DAS) 8 used for the vehicle. For example, the domain control unit 7 may determine a specific situation, a specific condition, event generation, performing control operation, etc., on the basis of data acquired from at least one among the camera module 2, the non-image sensor module 3, the in-vehicle sensor module 4, the communication module 5, and the driver assistance system module 8.

The domain control unit 7 may transmit a signal for controlling operation of a variety of driver assistance system modules 8 included inside the vehicle by using determined information, and the like. For example, the driver assistance system module 8 may include a blind spot detection (BSD) system module 8a, a lane-keeping assist system (LKAS) system 8b, an adaptive smart cruise control (ASCC) system module 8b, and the like. In addition, various kinds of driver assistance system modules 8 may be provided in the vehicle, such as a lane departure warning system (LDWS), a lane change assist system (LCAS), a parking assist system (PAS), and the like. The terms and names of the driver assistance systems described herein are illustratively presented and are not limited thereto. The driver assistance system module 8 may include an autonomous driving module for autonomous driving. The domain control unit may control the vehicle to perform autonomous driving via control of individual system modules included in the driver assistance system module 8.

The terms and exemplary descriptions of respective elements described in FIG. 2A are for convenience of understanding, and the elements are not limited to the corresponding terms and exemplary descriptions. Hereinafter, the above-described terms may be modified in order to more clearly describe embodiments according to the present disclosure. The elements of the vehicle explained in FIG. 2A have been illustratively described. Hereinafter, in order to more clearly describe the present technical idea, the elements may be modified or omitted, or other elements may be added.

Referring to FIG. 2B, a driving support apparatus 100 according to the present embodiments may include at least one module among an information acquisition module 110, an alert module 120, a collision prevention module 130, a control module 140, a braking module 150, and the like. According to an embodiment, the domain control unit 7 may be implemented to include the collision prevention module 130, the control module 140, and the braking module 150. The domain control unit 7 may process state information of the vehicle and state information of nearby vehicles which are detected by the information acquisition module, may adjust the braking time point of the vehicle, and may control at least one driver assistance system module provided in the vehicle. The domain control unit 7 may determine a collision risk of the vehicle on the basis of at least one of state information of the vehicle and state information of nearby vehicles, may control operation of the alert module according to the result of determination on the collision risk of the vehicle, may determine driving intervention of a driver, may adjust the braking time point of the vehicle according to the result of determination on driving intervention of the driver, and may control the vehicle to be braked on the basis of the braking time point of the vehicle.

The information acquisition module 110 may be disposed in the vehicle so as to acquire at least one of state information of the vehicle and state information of nearby vehicles. According to an example, in order to acquire state information of nearby vehicles, the information acquisition module 110 may include at least one of the camera module 2 configured to be disposed in the vehicle to have a view of the outside the vehicle so as to capture image data and process the captured image data, and at least one non-image sensor module 3 configured to be disposed in the vehicle to have a sensing area outside the vehicle so as to capture sensing data and process the captured sensing data. Further, the information acquisition module may include at least one in-vehicle sensor module 4 that is disposed in the vehicle to sense state information of the vehicle and process the sensed state information of the vehicle.

For example, the information acquisition module 110 may measure at least one of the state of the vehicle and states of nearby vehicles via at least one sensor, and may acquire at least one of state information of the vehicle and state information of nearby vehicles on the basis of measurement of the states.

The at least one sensor may include at least one sensor among a laser sensor, a vision sensor, and an ultrasonic sensor, but is not limited thereto. The at least one sensor may include any sensor as long as the state of the vehicle and/or states of nearby vehicles can be measured and thus state information of the vehicle and state information of nearby vehicles may be acquired using the sensor.

Particularly, a radar sensor may be mounted on one side surface of the vehicle and may sense a nearby vehicle (e.g., a forward vehicle) by transmitting or receiving a radar signal. Due to straightness and the property of reflection from the ground, the radar sensor may sense not only a forward vehicle but also a forward vehicle of the forward vehicle and a forward vehicle of the forward vehicle of the forward vehicle.

When mounting the radar sensor according to the present embodiments in the front side of the vehicle, by mounting the radar sensor on the front side of the vehicle and angled about 1 or 2 degrees downwards, not only a forward vehicle but also a forward vehicle of the forward vehicle and a forward vehicle of the forward vehicle of the forward vehicle can be more efficiently sensed.

The radar sensor according to the present embodiments may be mounted in the rear side of the vehicle to determine whether a rear vehicle is close to the vehicle, in which case moving up of a braking time point of the vehicle may be prevented.

The alert module 120 may generate a collision risk alert. Specifically, the alert module 120 may be connected to the collision prevention module 130. The collision prevention module 130 may control operation of the alert module 120.

For example, when the vehicle has a high possibility of collision with nearby vehicles and it is thus determined that there is a collision risk, the collision prevention module 130 may control operation of the alert module 120 to generate a collision risk alert.

In another example, when the vehicle has a low possibility of collision with nearby vehicles and it is thus determined that there is no collision risk, the collision prevention module 130 may control operation of the alert module 120 so that a collision risk alert is not generated.

The alert module 120 may include a buzzer, a speaker, and/or the like, but is not limited thereto. The alert module 120 may include any device as long as a collision risk can be made known (or displayed or indicated) using the device.

The collision prevention module 130 may be understood to be the same element as the collision prevention apparatus 10 described with reference to FIG. 1B, and therefore the collision prevention module 130, which will be described later, may perform all of the functions of the collision prevention apparatus 10 described with reference to FIG. 1B. According to an example, the collision prevention module 130 may be included in the domain control unit 7.

The control module 140 may control the vehicle to be braked on the basis of a braking time point of the vehicle. According to an embodiment, the control module 140 may be included in the domain control unit 7.

Specifically, the control module 140 may be connected to the collision prevention module 130. The control module 140 may receive a braking time point of the vehicle (or a steering time point of the vehicle) from the collision prevention module 130. The control module 140 may control the braking module 150 so that the vehicle is braked on the basis of the braking time point of the vehicle.

The braking module 150 may control the vehicle. According to an embodiment, the braking module 150 may be included in the domain control unit 7.

Specifically, the braking module 150 may be connected to the control module 140. The control module 140 may control the operation of the braking module 150. The brake module 150 may be controlled in operation by the control module 140 so as to brake the vehicle.

The braking module 150 may include a brake, but is not limited thereto, and may include any device that is associated with braking of the vehicle.

Hereinafter, a collision prevention method according to the present embodiments will be described with reference to the accompanying drawings. Particularly, parts overlapping the collision prevention apparatus and the driving support apparatus according to the present embodiments described with reference to FIG. 1A to FIG. 2B will be omitted hereinafter for the sake of explanation.

A collision prevention method according to the present embodiments may be performed via a collision prevention apparatus and a driving support apparatus.

Figure 3:
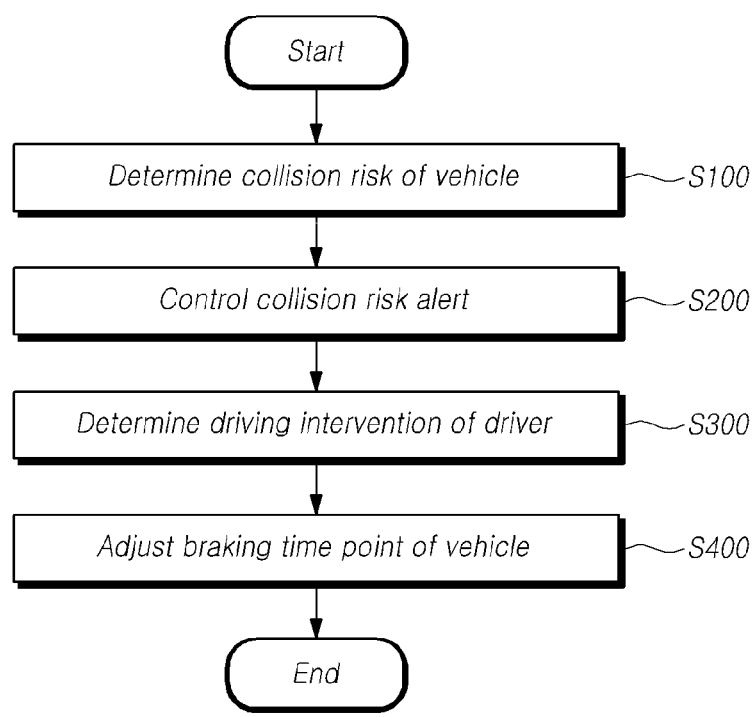
FIG. 3 is an overall flowchart for illustrating a collision prevention method according to the present embodiments.

FIG. 3 is an overall flowchart for illustrating a collision prevention method according to the present embodiments.

Referring to FIG. 3, the collision prevention method according to the present embodiments may include determining S100 a collision risk of a vehicle, controlling S200 a collision risk alert, determining S300 driving intervention of a driver, adjusting S400 a braking time point of the vehicle, and the like.

First, a collision risk of the vehicle may be determined S100.

For example, the collision risk of the vehicle may be determined on the basis of at least one of state information of the vehicle and state information of nearby vehicles. That is, on the basis of at least one of the state information of the vehicle and the state information of nearby vehicles, it may be determined that there is a collision risk of the vehicle when the possibility of collision between the vehicle and nearby vehicles is high, and it may be determined that there is no collision risk of the vehicle when the possibility of collision between the vehicle and nearby vehicles is low.

Therefore, a collision risk alert may be controlled S200 according to a result of determination on the collision risk of the vehicle.

Specifically, operation of an alert module may be controlled (or adjusted) according to the result of determination S100 on the collision risk of the vehicle. When there is a collision risk of the vehicle according to the result of determination S100 on the collision risk of the vehicle, operation of the alert module may be controlled (or adjusted) to generate a collision risk alert.

When there is no collision risk of the vehicle according to the result of determination S100 on the collision risk of the vehicle, operation of the alert module may be controlled (or adjusted) so that a collision risk alert is not generated.

Therefore, driving intervention by a driver may be determined S300.

For example, driving intervention by the driver may be determined on the basis of at least one of the state information of the vehicle and the state information of nearby vehicles. That is, on the basis of at least one of the state information of the vehicle and the state information of nearby vehicles, it may be determined that the driver intervenes in driving when the driver intervenes in driving, or it may be determined that the driver does not intervene in driving when the driver does not intervene in driving.

Thereafter, a braking time point of the vehicle may be adjusted S400 according to a result of determination on driving intervention of the driver.

For example, a braking time point of the vehicle (or a steering time point of the vehicle) may be adjusted (or controlled) according to the result of determination S300 on driving intervention of the driver.

When the result of determination S300 on driving intervention of the driver shows that the driver intervenes in driving, the braking time point of the vehicle (or a steering time point of the vehicle) may be adjusted (or controlled) so as to maintain the current braking time point of the vehicle (or the current steering time point of the vehicle).

When the result of determination S300 on driving intervention of the driver shows that the driver does not intervene in driving, the braking time point of the vehicle (or a steering time point of the vehicle) may be adjusted (or controlled) so that the braking time point of the vehicle (or the steering time point of the vehicle) is moved up before the current braking time point of the vehicle (or the current steering time point of the vehicle).

Meanwhile, operation of the alert module may be controlled (or adjusted) according to the result of determination on the collision risk of the vehicle, and then the braking time point of the vehicle (or a steering time point of the vehicle) may be adjusted (or controlled) according to the result of driving intervention of the driver.

For example, when there is a collision risk of the vehicle, operation of the alert module may be controlled (or adjusted) so as to generate a collision risk alert, and after the collision risk alert is generated, the braking time point of the vehicle (or the steering time point of the vehicle) may be adjusted (or controlled) according to the result of determination on driving intervention of the driver.

Specifically, when there is no collision risk of the vehicle according to the result of determination on the collision risk of the vehicle, operation of the alert module may be controlled (or adjusted) so that a collision risk alert is not generated.

When there is a collision risk of the vehicle according to the result of determination on the collision risk of the vehicle, operation of the alert module may be controlled (or adjusted) so as to generate a collision risk alert.

After the collision risk alert is generated, the braking time point of the vehicle (or the steering time point of the vehicle) may be adjusted (or controlled) according to the result of determination on driving intervention of the driver.

That is, after the collision risk alert is generated, when the result of determination on driving intervention of the driver shows that the driver intervenes in driving, the braking time point of the vehicle (or the steering time point of the vehicle) may be adjusted (or controlled) so as to maintain the current braking time point of the vehicle (or the current steering time point of the vehicle).

After the collision risk alert is generated, when the result of determination on driving intervention of the driver shows that the driver does not intervene in driving, the braking time point of the vehicle (or the steering time point of the vehicle) may be adjusted (or controlled) so that the braking time point of the vehicle (or the steering time point of the vehicle) is moved up before the current braking time point of the vehicle (or the current steering time point of the vehicle).

For example, after the collision risk alert is generated, when the result of determination on driving intervention of the driver shows that the driver does not intervene in driving, the braking time point of the vehicle (or the steering time point of the vehicle) may be adjusted (or controlled) on the basis of at least one value among a value of time to collision (TTC) between the forward vehicles and a value of a distance between the forward vehicles.

That is, after the collision risk alert is generated, when the result of determination on driving intervention of the driver shows that the driver does not intervene in driving, comparison may be performed of at least one between a predetermined reference value of time to collision and a value of time to collision between the forward vehicles, and between a predetermined reference distance value and a value of the distance between the forward vehicles, and the braking time point of the vehicle (or the steering time point of the vehicle) may be adjusted (or controlled) according to a comparison result.

In at least one of the case where the value of time to collision between the forward vehicles is smaller than the predetermined reference value of time to collision and the case where the value of distance between the forward vehicles is smaller than the predetermined reference distance value, the braking time point of the vehicle (or the steering time point of the vehicle) may be adjusted (or controlled) so that the braking time point of the vehicle (or the steering time point of the vehicle) is moved up before the current braking time point of the vehicle (or the current steering time point of the vehicle).

In at least one of the case where the value of time to collision between the forward vehicles is equal to or larger than the predetermined reference value of time to collision, and the case where the value of the distance between the forward vehicles is equal to or larger than the predetermined reference distance value, the braking time point of the vehicle (or the steering time point of the vehicle) may be adjusted (or controlled) so as to maintain the current braking time point of the vehicle (or the current steering time point of the vehicle).

The predetermined reference distance value may be a reference value indicating whether the forward vehicles have entered a congested area.

The value of time to collision between the first and second forward vehicles may be calculated using Equation 1 below.

$$TTC_{12} = \frac{d_2 - d_1}{v_2 - v_1} \qquad \text{[Equation 1]}$$

In particular, d2−d1 may represent a value of the distance between the first and second forward vehicles, and v2−v1 may represent a speed value between the first and second forward vehicles.

Figure 4:
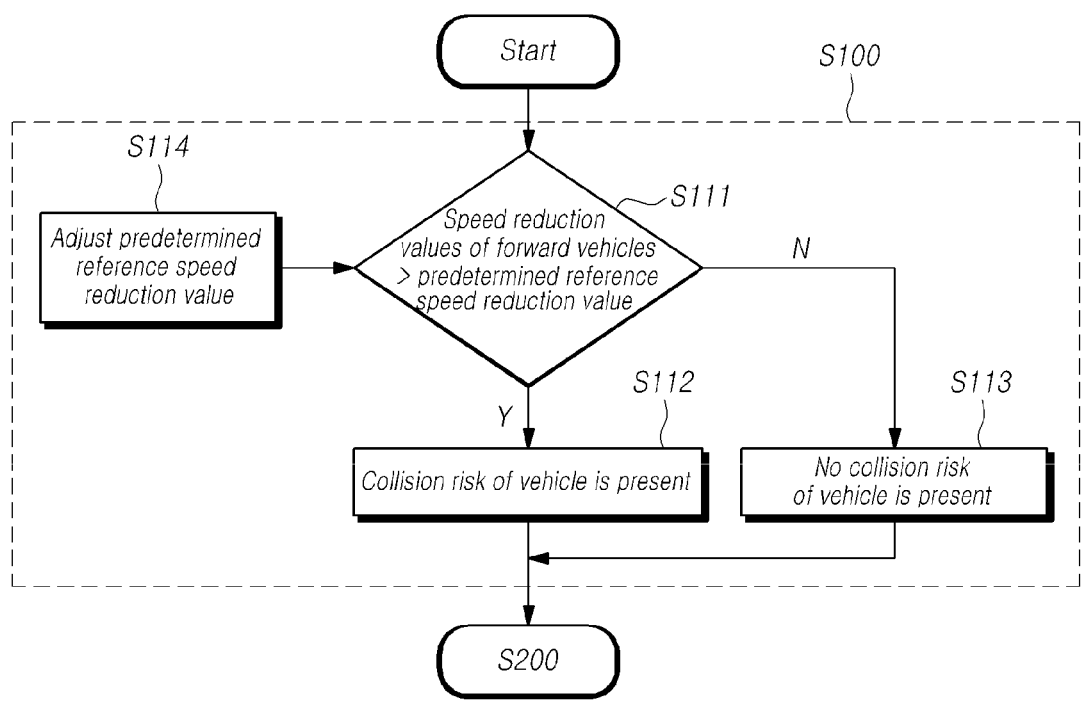
FIG. 4 to FIG. 6 are specific flowcharts for illustrating a method of determining a collision risk of a vehicle according to the present embodiments.
Figure 5:
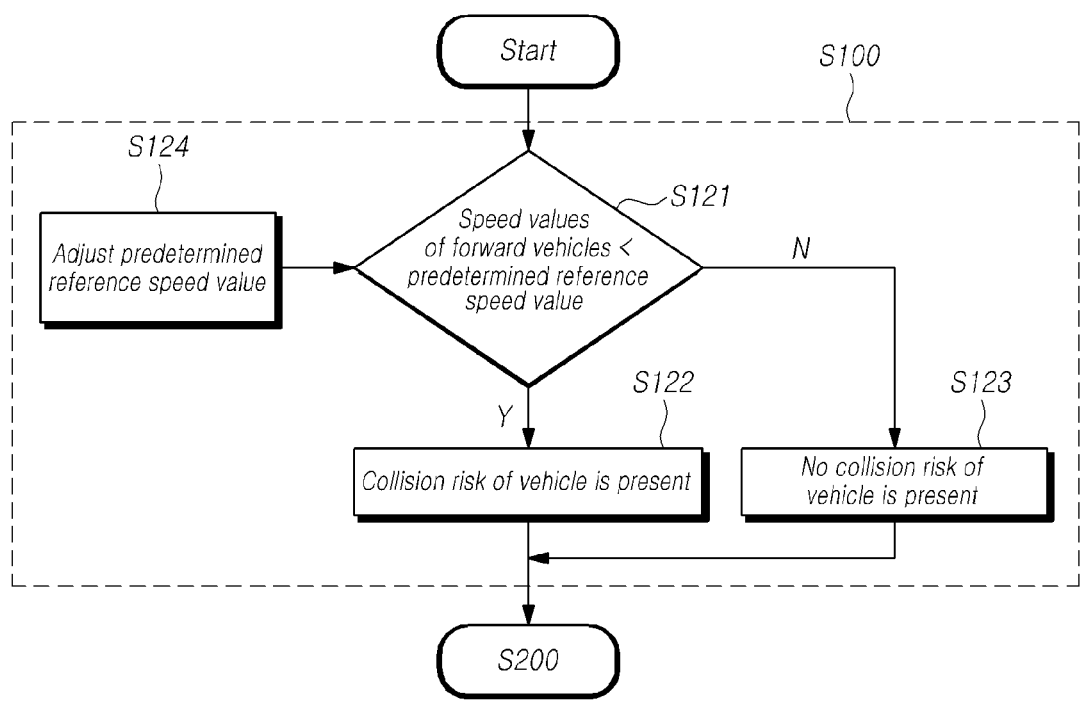
Figure 6:
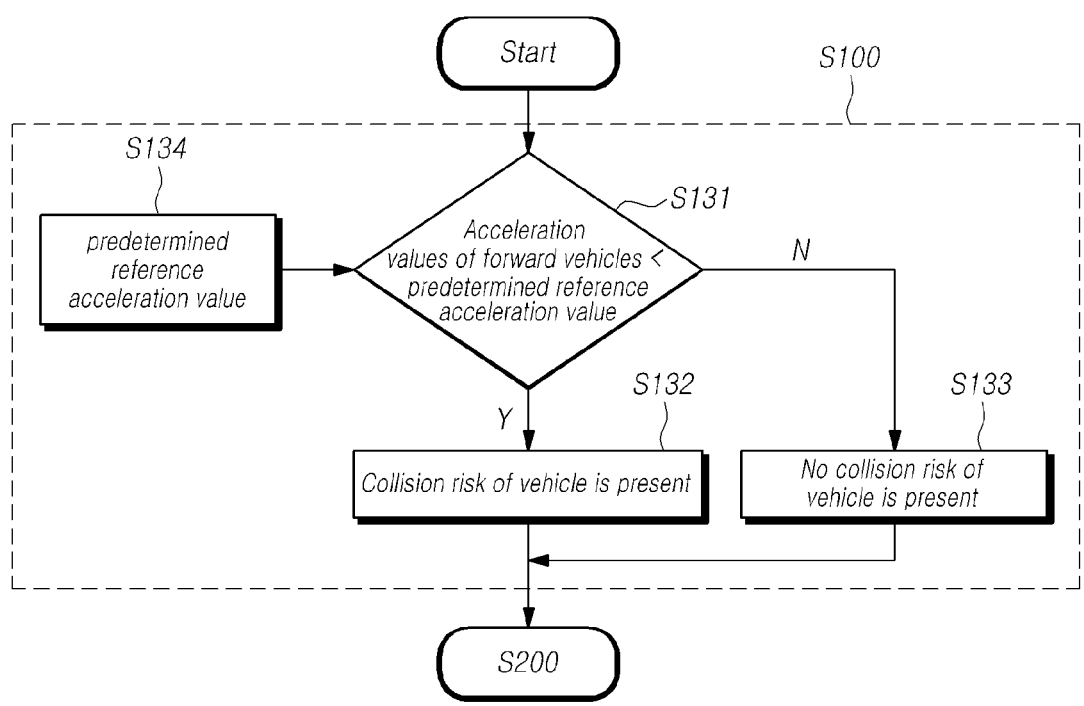

FIG. 4 to FIG. 6 are specific flowcharts for illustrating a method of determining a collision risk of a vehicle according to the present embodiments.

Referring to FIG. 4 to FIG. 6, a method of determining a collision risk of a vehicle may include determining a collision risk of the vehicle on the basis of at least one of state information of the vehicle and state information of nearby vehicles.

For example, the method of determining a collision risk of the vehicle according to the present embodiments may include determining a collision risk of the vehicle on the basis of at least one value among speed reduction values of forward vehicles, speed values of forward vehicles, and acceleration values of forward vehicles.

The method of determining a collision risk of the vehicle according to the present embodiments may include adjusting at least one among a predetermined reference speed reduction value, a predetermined reference speed value, and a predetermined reference acceleration value according to a vehicle driving time of a driver.

Referring to FIG. 4, a collision risk of the vehicle may be determined on the basis of speed reduction state information of forward vehicles.

For example, a collision risk of the vehicle may be determined by determining speed reduction states of forward vehicles on the basis of the speed reduction state information of the forward vehicles from among the state information of nearby vehicles.

That is, the speed reduction values of forward vehicles may be compared with the predetermined reference speed reduction value, and a collision risk of the vehicle may be determined according to a comparison result in S111.

When the speed reduction values of forward vehicles exceed the predetermined reference speed reduction value according to the comparison result in S111, it may be determined S112 that there is a collision risk of the vehicle due to a high possibility of collision between the vehicle and nearby vehicles.

When the speed reduction values of forward vehicles are equal to or smaller than the predetermined reference speed reduction value according to the comparison result in S111, it may be determined S113 that there is no collision risk of the vehicle due to a low possibility of collision between the vehicle and nearby vehicles.

The predetermined reference speed reduction value, which is a reference value by which the degree of a collision risk of the vehicle may be determined, may be a previously stored value and/or variable value, and or may alternatively be a single value, but is not limited thereto. The predetermined reference speed reduction value may have multiple values or fall in multiple ranges.

The predetermined reference speed reduction value may be adjusted S114 according to a vehicle driving time of the driver.

For example, the vehicle driving time of the driver is compared with a predetermined reference driving time, and the predetermined reference speed reduction value may be adjusted according to a comparison result.

When the vehicle driving time of the driver is equal to or longer than the predetermined reference driving time according to the comparison result, the predetermined reference speed reduction value may be lowered.

That is, when the driver has been driving for a long time, that is, when the driving time of the driver is long, the collision prevention method according to the present embodiments may include reducing the reference values so as to sensitively perform determination on a collision risk of the vehicle.

When the vehicle driving time of the driver is shorter than the predetermined reference driving time according to the comparison result, the predetermined reference speed reduction value may be maintained.

Referring to FIG. 5, a collision risk of the vehicle may be determined on the basis of speed values of forward vehicles.

That is, speed values of forward vehicles may be compared with a predetermined reference speed value, and a collision risk of the vehicle may be determined S121 according to the comparison result.

When the speed values of forward vehicles are smaller than the predetermined reference speed value according to the comparison result in S121, it may be determined S122 that there is a collision risk of the vehicle due to a high possibility of collision between the vehicle and nearby vehicles.

When the comparison result in S121 shows at least one of the case where the speed values of the forward vehicles are equal to or larger than the predetermined reference speed value and the case where acceleration values of the forward vehicles are equal to or larger than a predetermined reference acceleration value, it may be determined S123 that there is no collision risk of the vehicle due to the low possibility of collision between the vehicle and nearby vehicles.

The predetermined reference speed value is a reference value, by which the degree of a collision risk of the vehicle may be determined, and may be a previously stored value and/or a variable value, or may alternatively be a single value, but is not limited thereto. The predetermined reference speed value may have multiple values or fall in multiple ranges. The predetermined reference speed value may be 80 kph, but is not limited thereto, and may be modified and implemented.

The predetermined reference speed value may be adjusted S124 according to a vehicle driving time of a driver.

For example, the vehicle driving time of the driver may be compared with the predetermined reference driving time, and the predetermined reference speed value may be adjusted according to the comparison result.

When the vehicle driving time of the driver is equal to or longer than the predetermined reference driving time according to the comparison result, the predetermined reference speed value may be lowered.

That is, when the driver has been driving for a long time, that is, when the driving time of the driver is long, the collision prevention method according to the present embodiments may include reducing the reference values so as to sensitively perform determination on a collision risk of the vehicle.

When the vehicle driving time of the driver is smaller than the predetermined reference driving time according to the comparison result, the predetermined reference speed value may be maintained.

Referring to FIG. 6, a collision risk of the vehicle may be determined on the basis of acceleration values of forward vehicles.

That is, acceleration values of forward vehicles may be compared with a predetermined reference acceleration value, and a collision risk of the vehicle may be determined S131 according to the comparison result.

When the acceleration values of forward vehicles are smaller than the predetermined reference acceleration value according to the comparison result in S131, it may be determined that there is a collision risk of the vehicle due to a high possibility of collision between the vehicle and nearby vehicles.

When the acceleration values of forward vehicles are equal to or larger than the predetermined reference acceleration value according to the comparison result in S131, it may be determined that there is no collision risk of the vehicle due to a low possibility of collision between the vehicle and nearby vehicles.

The predetermined reference acceleration value is a reference value, by which the degree of a collision risk of the vehicle may be determined, and may be a previously stored value and/or a variable value or may alternatively be a single value, but is not limited thereto. The predetermined reference acceleration value may have multiple values or fall in multiple ranges. The predetermined reference acceleration value may be 0.1, but is not limited thereto, and may be modified and implemented.

The predetermined reference acceleration value may be adjusted S134 according to a vehicle driving time of the driver.

For example, the vehicle driving time of the driver may be compared with a predetermined reference driving time, and at least one of predetermined acceleration values may be adjusted according to the comparison result.

When the vehicle driving time of the driver is equal to or longer than the predetermined reference driving time, at least one of predetermined reference acceleration values may be lowered.

That is, when the driver has been driving for a long time, that is, when the driving time of the driver is long, the collision prevention method according to the present embodiments may include reducing the reference values so as to sensitively perform determination on the collision risk of the vehicle.

When the vehicle driving time of the driver is shorter than the predetermined reference driving time according to the comparison result, at least one value among the predetermined reference speed reduction value, the predetermined reference speed value, and the predetermined reference acceleration value may be maintained.

Figure 7:
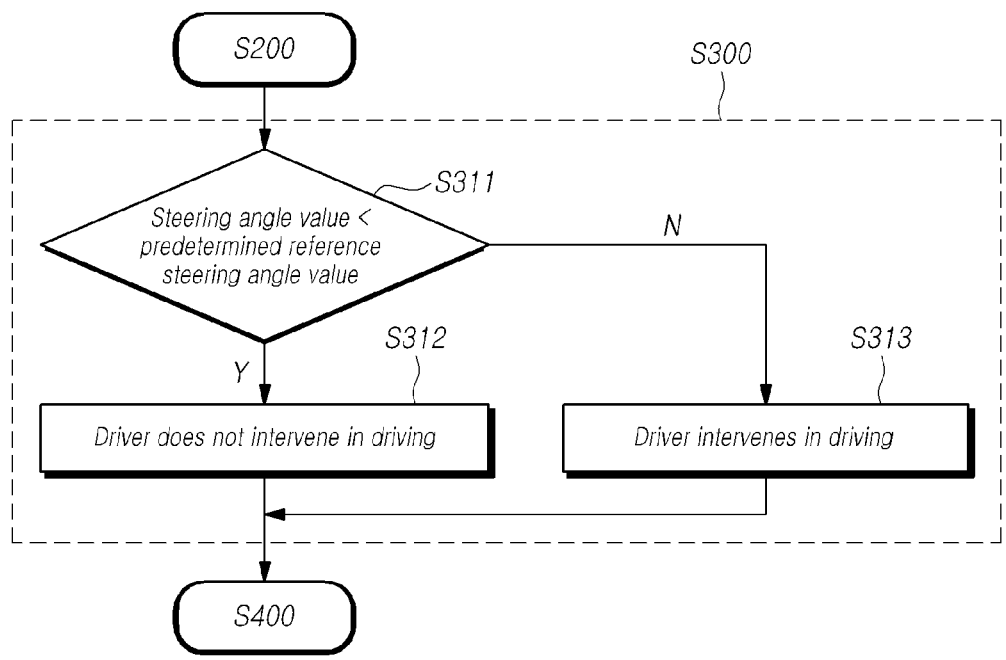
FIG. 7 to FIG. 9 are specific flowcharts for illustrating a method of determining driving intervention of a driver according to the present embodiments.
Figure 8:
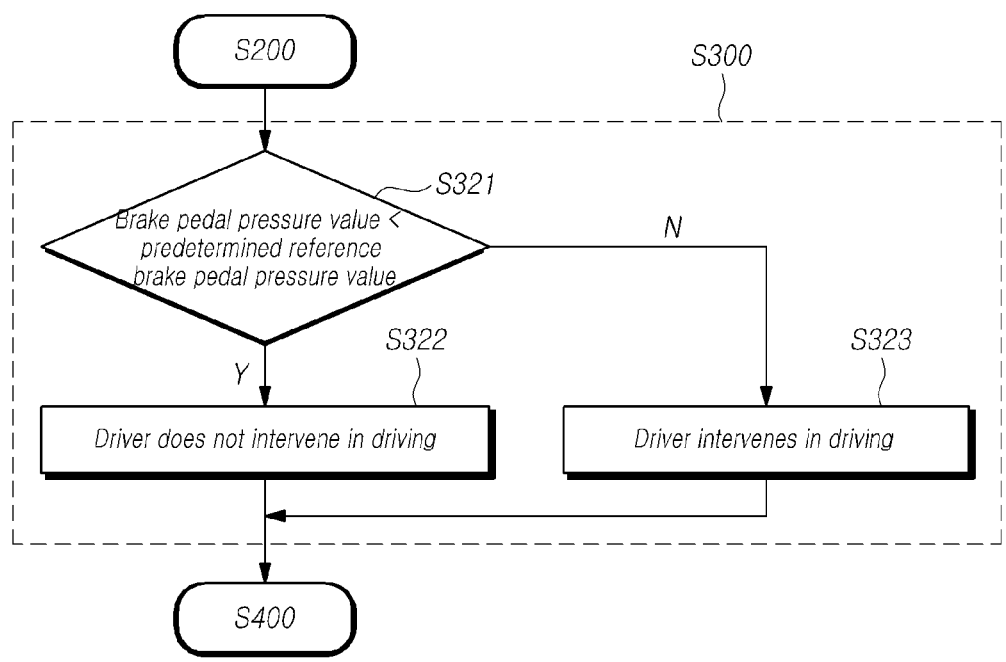
Figure 9:
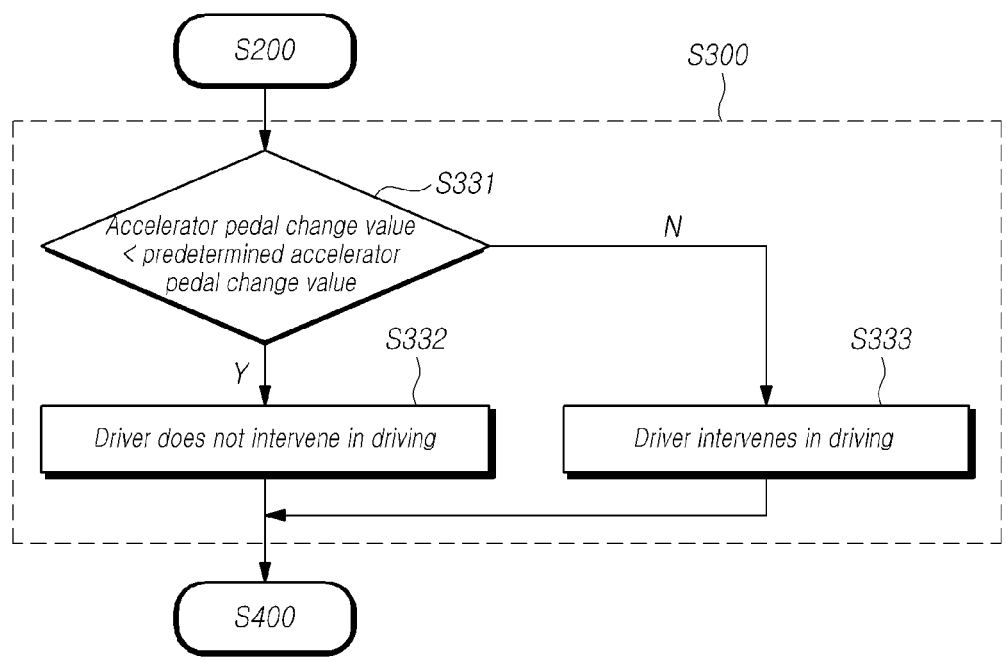

FIG. 7 to FIG. 9 are specific flowcharts for illustrating a method of determining driving intervention of a driver according to the present embodiments.

Referring to FIG. 7 to FIG. 9, a method of determining driving intervention of a driver according to the present embodiments may include determining driving intervention of the driver on the basis of at least one of steering angle information, brake pedal information, and accelerator pedal information among the state information of the vehicle.

Referring to FIG. 7, a steering angle value may be compared with a predetermined reference steering angle value, and driving intervention of a driver may be determined S311 according to the comparison result.

When the steering angle value is smaller than the predetermined reference steering angle value according to the comparison result in S311, it may be determined S312 that the driver does not intervene in driving.

When the steering angle value is equal to or larger than the predetermined reference steering angle value according to the comparison result in S311, it may be determined S313 that the driver intervenes in driving.

The predetermined reference steering angle value is a reference value, by which whether the driver intervenes in driving may be determined, and may be a previously stored value and/or a variable value, or may alternatively be a single value, but is not limited thereto. The predetermined reference steering angle value may have multiple values or fall in multiple ranges. The predetermined reference steering angle value may be 20 deg/sec, but is not limited thereto, and may be modified and implemented.

Referring to FIG. 8, a brake pedal pressure value may be compared with a predetermined reference brake pedal pressure value, and whether a driver intervenes in driving may be determined S321 according to the comparison result.

When the brake pedal pressure value is smaller than the predetermined reference brake pedal pressure value according to the comparison result in S321, it may be determined that the driver does not intervene in driving.

When the brake pedal pressure value is equal to or larger than the predetermined reference brake pedal pressure value according to the comparison result in S321, it may be determined that the driver intervenes in driving.

The predetermined reference brake pedal pressure value is a reference value, by which whether the driver intervenes in driving may be determined, and may be a previously stored value and/or a variable value or may alternatively be a single value, but is not limited thereto. The predetermined reference brake pedal pressure value may have multiple values or fall in multiple ranges. The predetermined reference brake pedal pressure value may be 5 bar, but is not limited thereto, and may be modified and implemented.

Referring to FIG. 9, an accelerator pedal change value may be compared with a predetermined reference accelerator pedal change value, and whether a driver intervenes in driving may be determined S331 according to a comparison result.

When the accelerator pedal change value is smaller than the predetermined reference accelerator pedal change value according to the comparison result in S331, it may be determined S332 that the driver does not intervene in driving.

When the accelerator pedal change value is equal to or larger than the predetermined reference accelerator pedal change value according to the comparison result in S331, it may be determined S333 that the driver intervenes in driving.

The predetermined reference accelerator pedal change value is a reference value, by which whether the driver intervenes in driving may be determined, and may be a previously stored value and/or a variable value, or may alternatively be a single value, but is not limited thereto. The predetermined reference accelerator pedal change value may have multiple values or fall in multiple ranges. The predetermined reference accelerator pedal change value may be 20%/sec, but is not limited thereto, and may be modified and implemented.

Figure 10:
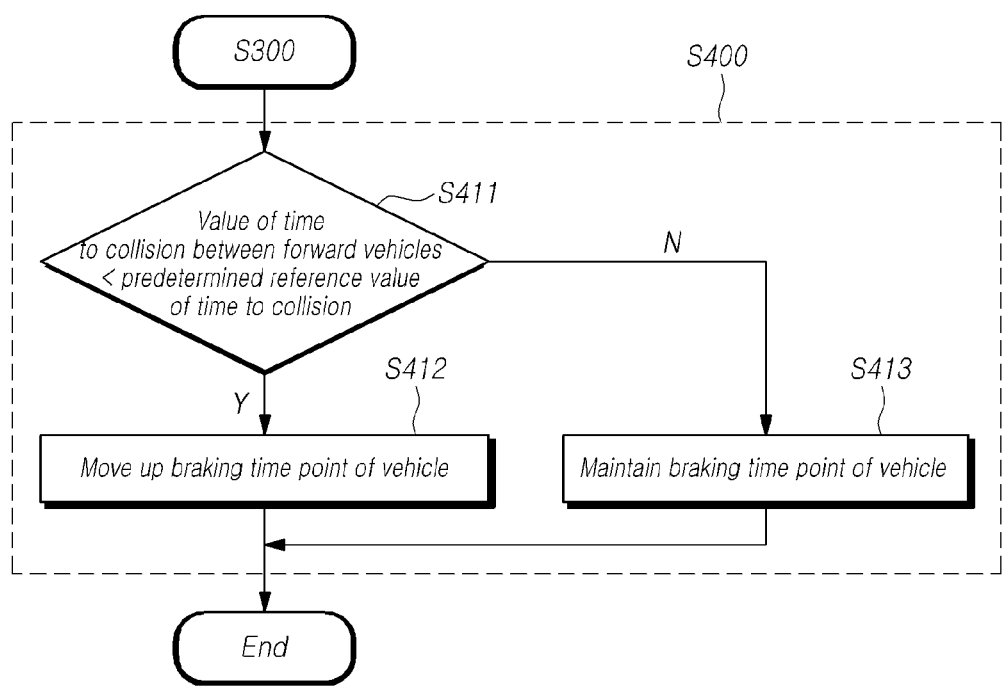
FIG. 10 and FIG. 11 are specific flowcharts for illustrating a method of adjusting a braking time point of a vehicle according to the present embodiments.
Figure 11:
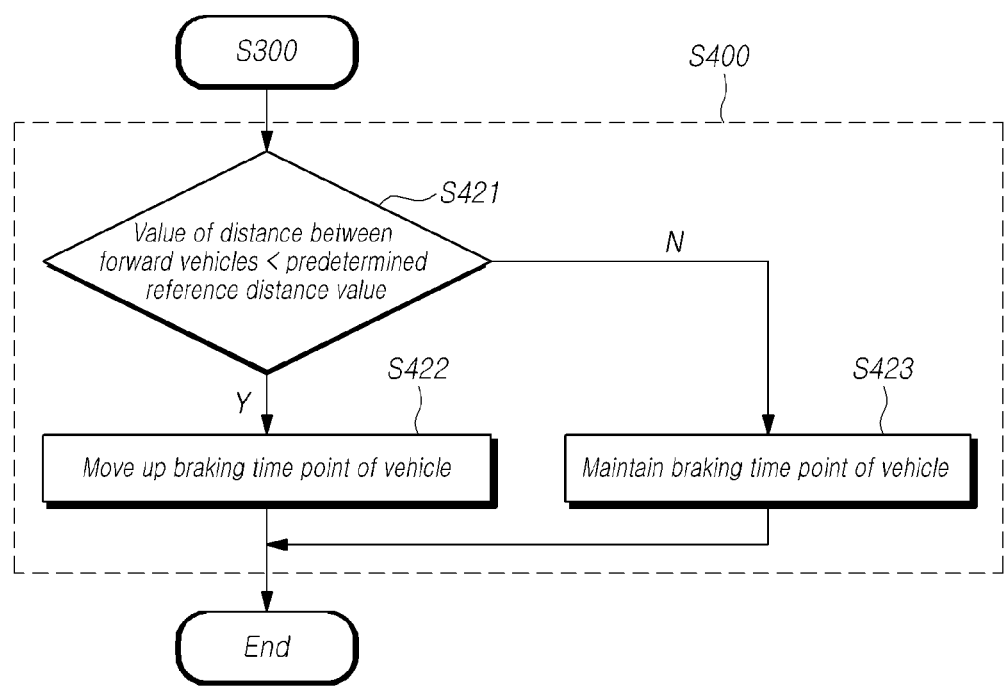

FIG. 10 and FIG. 11 are specific flowcharts for illustrating a method of adjusting a braking time point of a vehicle according to the present embodiments.

Referring to FIG. 10 and FIG. 11, a method of adjusting a braking time point of the vehicle according to the present embodiments may include adjusting (or controlling) a braking time point of the vehicle (or a steering time point of the vehicle) on the basis of at least one value among a value of time to collision (TTC) between forward vehicles and a value of a distance between forward vehicles, when a result of determination on driving intervention of a driver shows that the driver does not intervene in driving.

Referring to FIG. 10, when the result of determination on driving intervention of the driver shows that the driver does not intervene in driving, a value of time to collision between forward vehicles is compared S411 with a predetermined reference value of time to collision, and a braking time point of the vehicle (or a steering time point of the vehicle) may be adjusted (or controlled) S412 and S413 according to a comparison result.

When the value of time to collision between forward vehicles is smaller than the predetermined reference value of time to collision, the braking time point of the vehicle (or the steering time point of the vehicle) may be adjusted (or controlled) S412 so that the braking time point of the vehicle (or the steering time point of the vehicle) is moved up before the current braking time point of the vehicle (or the current steering time point of the vehicle).

When the value of time to collision between forward vehicles is equal to or larger than the predetermined reference value of time to collision, the braking time point of the vehicle (or the steering time point of the vehicle) may be adjusted (or controlled) S413 so as to maintain the current braking time point of the vehicle (or the current steering time point of the vehicle).

The predetermined reference value of time to collision is a reference value, by which whether the braking time point of the vehicle (or the steering time point of the vehicle) is adjusted (or controlled) may be determined, and may be a previously stored value and/or a variable value, or may alternatively be a single value, but is not limited thereto. The predetermined reference value of time to collision may have multiple values or fall in multiple ranges. The predetermined reference value of time to collision may be 2 sec, but is not limited thereto, and can be modified and implemented.

Referring to FIG. 11, when a result of determination on driving intervention of a driver shows that the driver does not intervene in driving, the value of a distance between forward vehicles may be compared S421 with at least one of predetermined reference distance values, and a braking time point of the vehicle (or a steering time point of the vehicle) may be adjusted (or controlled) S422 and S423 according to the comparison result.

When the value of the distance between forward vehicles is smaller than at least one of the predetermined reference distance values, the braking time point of the vehicle (or the steering time point of the vehicle) may be adjusted (or controlled) S422 so that the braking time point of the vehicle (or the steering time point of the vehicle) is moved up before the current braking time point of the vehicle (or the current steering time point of the vehicle).

When the value of the distance between forward vehicles corresponds to at least one of values equal to or larger than the predetermined reference distance values, the braking time point of the vehicle (or the steering time point of the vehicle) may be adjusted (or controlled) S423 so as to maintain the current braking time point of the vehicle (or the current steering time point of the vehicle).

The predetermined reference distance value may be a reference value, by which whether the braking time point of the vehicle (or the steering time point of the vehicle) is adjusted (or controlled) may be determined, and may be a previously stored value and/or a variable value, or may alternatively be a single value, but is not limited thereto. The predetermined reference distance value may have multiple values or fall in multiple ranges. The predetermined reference distance value may be 5 m, but it is not limited thereto, and can be modified and implemented. Particularly, the predetermined reference distance value may be a reference value indicating whether forward vehicles have entered a congested area.

Figure 12:
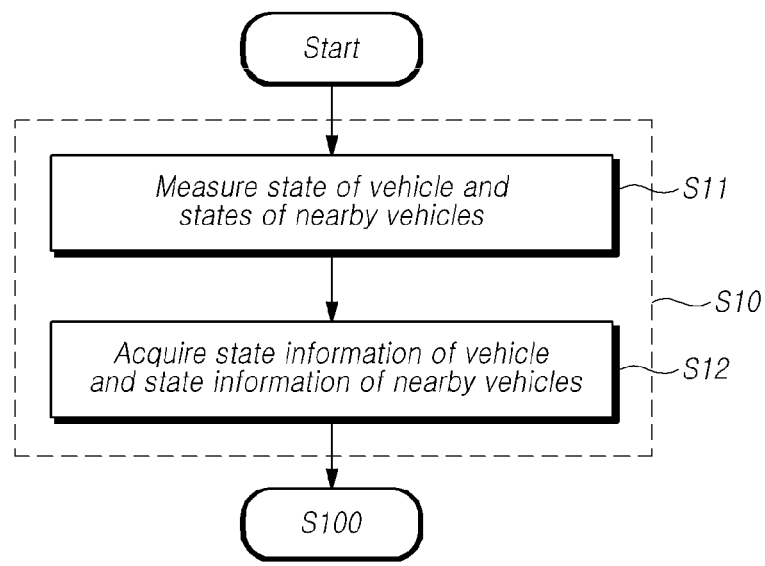
FIG. 12 is a specific flowchart for illustrating a method of acquiring state information of a vehicle and state information of nearby vehicles according to the present embodiments.

FIG. 12 is a specific flowchart for illustrating a method of acquiring state information of a vehicle and state information of nearby vehicles according to the present embodiments.

Referring to FIG. 12, a method of acquiring state information of a vehicle and state information of nearby vehicles according to the present embodiments may include measuring at least one state among a state of the vehicle and states of nearby vehicles and acquiring at least one of the state information of the vehicle and the state information of nearby vehicles, S10.

For example, first, at least one state among a state of a vehicle and states of nearby vehicles may be measured S11 using at least one sensor. Subsequently, at least one of state information of the vehicle and state information of nearby vehicles may be acquired S12 on the basis of at least one state among the state of the vehicle and the states of nearby vehicles obtained in S11.

The at least one sensor may include at least one sensor among a laser sensor, a vision sensor, and an ultrasonic sensor, but is not limited thereto. The at least one sensor may include any sensor as long as the state of the vehicle and/or states of nearby vehicles can be measured, and thus state information of the vehicle and/or state information of nearby vehicles may be acquired using the sensor.

In particular, a radar sensor may be mounted on one side surface of the vehicle and may sense a nearby vehicle (e.g., a forward vehicle) by transmitting or receiving a radar signal. Due to straightness and a property of reflection from the ground, the radar sensor may sense not only a forward vehicle but also a forward vehicle of the forward vehicle and a forward vehicle of the forward vehicle of the forward vehicle.

When mounting the radar sensor according to the present embodiments in the vehicle, by mounting the radar sensor in the vehicle so as to be oriented about 1 or 2 degrees downwards from horizontal, not only a forward vehicle but also a forward vehicle of the forward vehicle and a forward vehicle of the forward vehicle of the forward vehicle may be more efficiently sensed.

The radar sensor according to the present embodiments may be mounted on the rear side of the vehicle to determine whether a rear vehicle is close to the vehicle, in which case moving up of a braking time point of the vehicle may be prevented.

Figure 13:
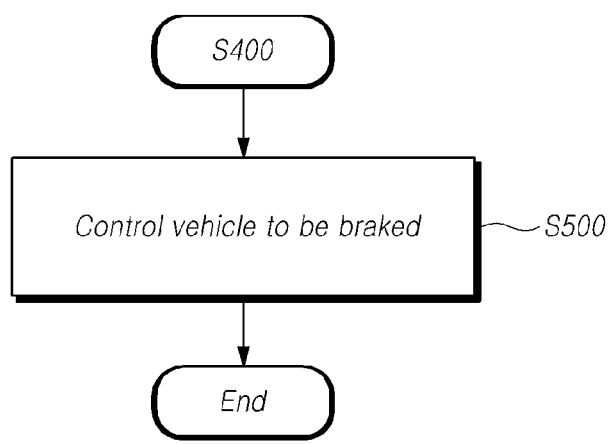
FIG. 13 is a specific flowchart for illustrating a method of controlling a vehicle according to the present embodiments.

FIG. 13 is a specific flowchart for illustrating a method of controlling a vehicle according to the present embodiments.

Referring to FIG. 13, after S400, a vehicle may be controlled S500 to be braked on the basis of a braking time point of the vehicle.

That is, first, a braking module may be controlled so that the vehicle is braked on the basis of the braking time point of the vehicle in S400. Subsequently, the vehicle may be braked via the braking module.

The braking module may include a brake, but is not limited thereto, and may include any device that is associated with braking of the vehicle.

Figure 14:
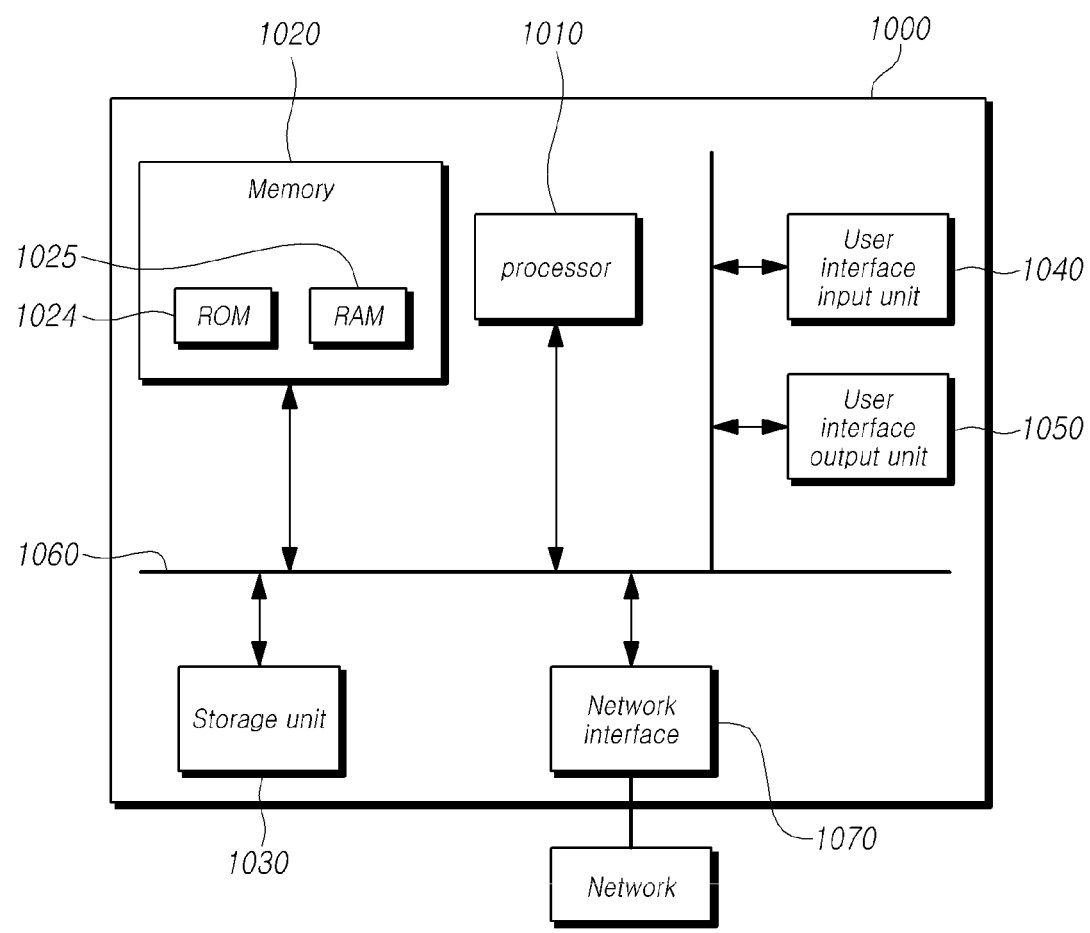
FIG. 14 is a block diagram for a computer system of a collision prevention apparatus and a driving support apparatus according to the present embodiments.

FIG. 14 is a block diagram for a computer system of a collision prevention apparatus and a driving support apparatus according to the present embodiments.

Referring to FIG. 14, the present embodiments described above may be implemented in a computer system, for example, as a computer-readable recording medium. As illustrated in the accompanying drawings, a computer system 1000 in the collision prevention apparatus, the driving support apparatus, etc. may include at least one element among one or more processors 1010, a memory 1020, a storage unit 1030, a user interface input unit 1040, and a user interface output unit 1050, and these elements may communicate with each other via a bus 1060. The computer system 1000 may further include a network interface 1070 for accessing a network. The processor 1010 may be a CPU or a semiconductor device, which executes processing instructions stored in the memory 1020 and/or the storage unit 1030. The memory 1020 and the storage unit 1030 may include various types of volatile/nonvolatile storage media. For example, the memory may include a ROM 1021 and a RAM 1023.

Accordingly, the present embodiments may be implemented in a non-volatile computer storage medium in which a computer-implemented method or computer-executable instructions are stored. The instructions may perform, when executed by the processor, a method according to at least one embodiment of the present embodiments.

Descriptions of a collision prevention apparatus and method and a driving support apparatus have been provided according to the present embodiments. However, the present disclosure is not limited to these embodiments. Further, it is possible to carry out various modifications and implementations without departing from the scope of the appended claims, the detailed description, and the accompanying drawings. Such modifications and implementations also fall within the scope of the present disclosure.

What is claimed is:

1. A collision prevention apparatus comprising:
at least one in-vehicle sensor configured to sense state information of a vehicle; and
a controller communicatively coupled to the at least one in-vehicle sensor and configured to:
determine a collision risk of the vehicle;
determine driving intervention of a driver based on the sensed state information of the vehicle;
control a collision risk alert according to a result of determination on the collision risk of the vehicle and adjust a braking time point of the vehicle according to a result of determination on driving intervention of the driver;
perform comparison of at least one of speed values, including speed values of forward vehicles and a predetermined reference speed value, or acceleration values, including acceleration values of the forward vehicles and a predetermined reference acceleration value;
determine the collision risk of the vehicle according to a comparison result; and
adjust at least one of the predetermined reference speed value or the predetermined reference acceleration value according to a vehicle driving time of the driver, wherein the controller maintains the braking time point of the vehicle if the driver is intervened in driving, and advances the braking time point of the vehicle if the driver is not intervened in driving, and wherein, if the forward vehicles, detected by a radar sensor mounted to be oriented downwards from horizontal on the front of the vehicle, comprise a first forward vehicle located in front of the vehicle, a second forward vehicle located in front of the first forward vehicle, and a third forward vehicle located in front of the second forward vehicle, the controller determines that there is the collision risk of the vehicle in at least one of a case where a speed value of the first forward vehicle is smaller than the predetermined reference speed value, a case where a speed value of the second forward vehicle is smaller than the predetermined reference speed value, a case where a speed value of the third forward vehicle is smaller than the predetermined reference speed value, a case where an acceleration value of the first forward vehicle is smaller than a predetermined acceleration value, a case where an acceleration value of the second forward vehicle is smaller than the predetermined acceleration value, or a case where an acceleration value of the third forward vehicle is smaller than the predetermined acceleration value.

2. The collision prevention apparatus of claim 1, wherein the controller determines the collision risk of the vehicle on the basis of speed reduction state information of forward vehicles.

3. The collision prevention apparatus of claim 1, wherein the controller performs comparison of at least one of steering angle values, including a steering angle value of the vehicle and a predetermined reference steering angle value, brake pedal pressure values, including a brake pedal pressure value of the vehicle and a predetermined reference brake pedal pressure value, or accelerator pedal change values, including an accelerator pedal change value of the vehicle and a predetermined reference accelerator pedal change value, and determines driving intervention of the driver according to a comparison result.

4. The collision prevention apparatus of claim 1, wherein the controller performs control to cause the collision risk alert to be generated when there is the collision risk of the vehicle, and after the collision risk alert is generated, adjusts the braking time point of the vehicle according to the result of determination on driving intervention of the driver.

5. The collision prevention apparatus of claim 4, wherein the controller adjusts, when the driver does not intervene in driving, the braking time point of the vehicle on the basis of at least one value among a value of a time to collision (TTC) between forward vehicles and a value of a distance between the forward vehicles.

6. The collision prevention apparatus of claim 5, wherein the controller performs comparison of at least one of time to collision values, including a value of time to collision between the forward vehicles and a predetermined reference value of time to collision, or distance values, including a value of the distance between the forward vehicles and a predetermined reference distance value, and adjusts the braking time point of the vehicle according to a comparison result.

7. The collision prevention apparatus of claim 6, wherein the controller moves up the braking time point of the vehicle before a current braking time point of the vehicle in at least one of a case where the value of time to collision between the forward vehicles is smaller than the predetermined reference value of time to collision, or a case where the value of the distance between the forward vehicles is smaller than the predetermined reference distance value.

8. The collision prevention apparatus of claim 6, wherein, when the forward vehicles comprise the first, second, and third forward vehicles, the controller moves up the braking time point of the vehicle to control the vehicle, in at least one of a case where a value of time to collision (TTC) between the first and second forward vehicles is smaller than the predetermined value of time to collision, a case where a value of time to collision (TTC) between the second and third forward vehicles is smaller than the predetermined value of time to collision, a case where a value of a distance between the first and second forward vehicles is smaller than the predetermined distance value, or a case where a value of a distance between the second and third forward vehicles is smaller than the predetermined distance value.

9. A driving support apparatus comprising:
an information acquisition module configured to acquire at least one of state information of a vehicle or state information of nearby vehicles;
an alert module configured to generate a collision risk alert; and
a controller communicatively connected to the information acquisition module and the alert module and configured to:
determine a collision risk of the vehicle on the basis of at least one piece of information among the state information of the vehicle and the state information of the nearby vehicles,
control operation of the alert module according to a result of determination on the collision risk of the vehicle,
determine driving intervention of a driver,
adjust a braking time point of the vehicle according to a result of determination on driving intervention of the driver, and
control the vehicle to brake based on the braking time point of the vehicle,
perform comparison of at least one of speed values, including speed values of forward vehicles and a predetermined reference speed value, or acceleration values, including acceleration values of the forward vehicles and a predetermined reference acceleration value, and determine the collision risk of the vehicle according to a comparison result,
adjust at least one of the predetermined reference speed value or the predetermined reference acceleration value according to a vehicle driving time of the driver, and
maintain the braking time point of the vehicle if the driver is intervened in driving, and advance the braking time point of the vehicle if the driver is not intervened in driving,
wherein, if the forward vehicles, detected by a radar sensor mounted to be oriented downwards from horizontal on the front of the vehicle, comprise a first forward vehicle located in front of the vehicle, a second forward vehicle located in front of the first forward vehicle, and a third forward vehicle located in front of the second forward vehicle, the controller determines that there is the collision risk of the vehicle in at least one of a case where a speed value of the first forward vehicle is smaller than the predetermined reference speed value, a case where a speed value of the second forward vehicle is smaller than the predetermined reference speed value, a case where a speed value of the third forward vehicle is smaller than the predetermined reference speed value, a case where an acceleration value of the first forward vehicle is smaller than a predetermined acceleration value, a case where an acceleration value of the second forward vehicle is smaller than the predetermined acceleration value, or a case where an acceleration value of the third forward vehicle is smaller than the predetermined acceleration value.

10. The driving support apparatus of claim 9, wherein the controller performs comparison of at least one of steering angle values, including a steering angle value of the vehicle and a predetermined reference steering angle value, brake pedal pressure values, including a brake pedal pressure value of the vehicle and a predetermined reference brake pedal pressure value, or accelerator pedal change values, including an accelerator pedal change value of the vehicle and a predetermined reference accelerator pedal change value, and determines driving intervention of the driver according to a comparison result.

11. The driving support apparatus of claim 9, wherein the controller controls operation of the alert module to cause the collision risk alert to be generated when there is the collision risk of the vehicle, and after the collision risk alert is generated, determines driving intervention of the driver, and adjusts the braking time point of the vehicle according to the result of determination on driving intervention of the driver.

12. The driving support apparatus of claim 11, wherein the controller adjusts, when the driver does not intervene in driving, the braking time point of the vehicle on the basis of at least one value among a value of time to collision (TTC) between forward vehicles and a value of a distance between the forward vehicles.

13. The collision prevention method of claim 11, wherein the determining driving intervention comprising:
    performing comparison of at least one of steering angle values, including a steering angle value of the vehicle and a predetermined reference steering angle value, brake pedal pressure values, including a brake pedal pressure value of the vehicle and a predetermined reference brake pedal pressure value, or accelerator pedal change values, including an accelerator pedal change value of the vehicle and a predetermined reference accelerator pedal change value, and
    determining driving intervention of the driver according to a comparison result.

14. A collision prevention method comprising:
    determining a collision risk of a vehicle;
    controlling a collision risk alert according to a result of determination on the collision risk of the vehicle;
    determining driving intervention of a driver; and
    adjusting a braking time point of the vehicle according to a result of determination on driving intervention of the driver,
    wherein the determining driving intervention comprising:
        performing comparison of at least one of speed values, including speed values of forward vehicles and a predetermined reference speed value, or acceleration values, including acceleration values of the forward vehicles and a predetermined reference acceleration value, and determining the collision risk of the vehicle according to a comparison result, and
        adjusting at least one of the predetermined reference speed value or the predetermined reference acceleration value according to a vehicle driving time of the driver, and
    wherein the adjusting the braking time point comprising maintaining the braking time point of the vehicle if the driver is intervened in driving, and advance the braking time point of the vehicle if the driver is not intervened in driving, and
    wherein, if the forward vehicles, detected by a radar sensor mounted to be oriented downwards from horizontal on the front of the vehicle, comprise a first forward vehicle located in front of the vehicle, a second forward vehicle located in front of the first forward vehicle, and a third forward vehicle located in front of the second forward vehicle, the determining driving intervention comprising determining that there is a collision risk of the vehicle in at least one of a case where a speed value of the first forward vehicle is smaller than the predetermined reference speed value, a case where a speed value of the second forward vehicle is smaller than the predetermined reference speed value, a case where a speed value of the third forward vehicle is smaller than the predetermined reference speed value, a case where an acceleration value of the first forward vehicle is smaller than a predetermined acceleration value, a case where an acceleration value of the second forward vehicle is smaller than the predetermined acceleration value, or a case where an acceleration value of the third forward vehicle is smaller than the predetermined acceleration value.

* * * * *